(12) United States Patent
Dobrek et al.

(10) Patent No.: US 11,184,394 B1
(45) Date of Patent: *Nov. 23, 2021

(54) METHODS, SYSTEMS, AND DEVICES FOR ENCRYPTED ELECTRONIC STORAGE AND CONFIDENTIAL NETWORK TRANSFER OF PRIVATE DATA THROUGH A TRUSTLESS DISTRIBUTED LEDGER TECHNOLOGY SYSTEM

(71) Applicant: SYMBIONT.IO, INC., New York, NY (US)

(72) Inventors: Lukasz Dobrek, Ossining, NY (US); Adam Krellenstein, New York, NY (US); Pankaj Surana, New York, NY (US); Aaron Todd, New York, NY (US); Yiqun Yin, Riverside, CT (US)

(73) Assignee: SYMBIONT.IO, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,700

(22) Filed: Jun. 2, 2020

Related U.S. Application Data

(63) Continuation of application No. 16/392,473, filed on Apr. 23, 2019, now Pat. No. 10,728,283, which is a
(Continued)

(51) Int. Cl.
   *H04L 29/06* (2006.01)
   *G06F 21/60* (2013.01)
   (Continued)

(52) U.S. Cl.
   CPC .......... *H04L 63/18* (2013.01); *G06F 21/602* (2013.01); *H04L 9/0822* (2013.01);
   (Continued)

(58) Field of Classification Search
   CPC ... H04L 63/18; H04L 9/0822; H04L 63/0435; H04L 9/0825; H04L 9/14; H04L 2209/38;
   (Continued)

(56) References Cited

U.S. PATENT DOCUMENTS

| | | | |
|---|---|---|---|
| 5,550,976 | A | 8/1996 | Henderson et al. |
| 9,397,985 | B1 | 7/2016 | Seger et al. |

(Continued)

FOREIGN PATENT DOCUMENTS

| | | |
|---|---|---|
| EP | 2852121 | 3/2015 |
| WO | WO 2018/209222 | 11/2018 |

OTHER PUBLICATIONS

Zyskind, Guy, Oz Nathan, and Alex Pentland. "Enigma: Decentralized computation platform with guaranteed privacy." arXiv preprint arXiv:1506.03471 (2015). (Year: 2015).*

(Continued)

*Primary Examiner* — Shawnchoy Rahman
(74) *Attorney, Agent, or Firm* — Knobbe, Martens, Olson & Bear, LLP

(57) ABSTRACT

In some embodiments, systems, methods, and devices disclosed herein enable trusted sharing of private data and/or transactions via a distributed ledger, while maintaining data consistency properties. Some embodiments provide and utilize one or more independent and/or dependent channels. In particular, in some embodiments, one or more independent and/or dependent channels can exist on a single distributed ledger, wherein participants or nodes that are members of a particular channel can view and access the information in a given network transaction. To other participants or nodes not on the particular channel, however, only an encrypted or redacted version of the information can be viewable, thereby not disclosing the transaction information to such participants or nodes. In some embodiments, (Continued)

consistency properties may be preserved even in the presence of selective sharing of transaction information with proofs of validity.

20 Claims, 14 Drawing Sheets

Related U.S. Application Data continuation of application No. 16/213,251, filed on Dec. 7, 2018, now Pat. No. 10,320,843.

(60) Provisional application No. 62/596,573, filed on Dec. 8, 2017, provisional application No. 62/596,580, filed on Dec. 8, 2017.

(51) Int. Cl.
 *H04L 9/08* (2006.01)
 *H04L 9/32* (2006.01)
 *H04L 9/14* (2006.01)

(52) U.S. Cl.
 CPC .......... *H04L 9/0825* (2013.01); *H04L 9/0827* (2013.01); *H04L 9/0891* (2013.01); *H04L 9/14* (2013.01); *H04L 9/3239* (2013.01); *H04L 63/0435* (2013.01); *H04L 2209/38* (2013.01); *H04L 2209/76* (2013.01)

(58) Field of Classification Search
 CPC . H04L 2209/76; H04L 9/0827; H04L 9/0891; H04L 9/3239; G06F 21/602
 See application file for complete search history.

(56) References Cited

U.S. PATENT DOCUMENTS

| | | | |
|---|---|---|---|
| 9,569,771 B2 | 2/2017 | Lesavich et al. | |
| 9,722,790 B2 | 8/2017 | Ebrahimi | |
| 10,146,792 B1 | 12/2018 | Dobrek et al. | |
| 10,320,843 B1 | 6/2019 | Dobrek et al. | |
| 2005/0038732 A1 | 2/2005 | Sweeting et al. | |
| 2005/0204128 A1 | 9/2005 | Aday et al. | |
| 2006/0265259 A1 | 11/2006 | Diana et al. | |
| 2007/0129958 A1 | 6/2007 | Wu et al. | |
| 2009/0182667 A1 | 7/2009 | Parkes et al. | |
| 2014/0156534 A1 | 6/2014 | Quigley et al. | |
| 2015/0262176 A1 | 9/2015 | Langschaedel et al. | |
| 2016/0210710 A1 | 7/2016 | Glennon | |
| 2016/0342994 A1 | 11/2016 | Davis | |
| 2016/0379013 A1 | 12/2016 | Ganesan et al. | |
| 2017/0005804 A1 | 1/2017 | Zinder | |
| 2017/0017954 A1 | 1/2017 | McDonough et al. | |
| 2017/0046689 A1 | 2/2017 | Lohe et al. | |
| 2017/0046698 A1 | 2/2017 | Haldenby et al. | |
| 2017/0075941 A1 | 3/2017 | Finlow-Bates | |
| 2017/0085555 A1 | 3/2017 | Gisikalo et al. | |
| 2017/0104731 A1 | 4/2017 | Baudoin et al. | |
| 2017/0116693 A1 | 4/2017 | Rae et al. | |
| 2017/0124556 A1* | 5/2017 | Seger, II | H04L 69/40 |
| 2017/0161829 A1 | 6/2017 | Mazier | |
| 2017/0177898 A1 | 6/2017 | Dillenberger | |
| 2017/0230189 A1 | 8/2017 | Toll et al. | |
| 2017/0236104 A1 | 8/2017 | Biton | |
| 2017/0243193 A1 | 8/2017 | Manian et al. | |
| 2017/0279774 A1 | 9/2017 | Booz et al. | |
| 2017/0289111 A1* | 10/2017 | Voell | H04L 9/14 |
| 2017/0330159 A1 | 11/2017 | Castinado et al. | |
| 2017/0352012 A1 | 12/2017 | Hearn et al. | |
| 2017/0352116 A1 | 12/2017 | Pierce et al. | |
| 2018/0018738 A1 | 1/2018 | Bernauer | |
| 2018/0089641 A1 | 3/2018 | Chan et al. | |
| 2018/0101848 A1 | 4/2018 | Castagna et al. | |
| 2018/0117447 A1 | 5/2018 | Tran et al. | |
| 2018/0183768 A1 | 6/2018 | Lobban | |
| 2018/0253702 A1* | 9/2018 | Dowding | G06Q 20/06 |
| 2018/0254898 A1 | 9/2018 | Sprague et al. | |
| 2018/0262493 A1 | 9/2018 | Andrade | |
| 2018/0268386 A1 | 9/2018 | Wack et al. | |
| 2019/0012662 A1 | 1/2019 | Krellenstein et al. | |
| 2019/0013943 A1 | 1/2019 | Maim | |
| 2019/0052458 A1 | 2/2019 | Wright et al. | |
| 2019/0147532 A1 | 5/2019 | Singh et al. | |
| 2019/0166095 A1 | 5/2019 | Tobin | |
| 2019/0373137 A1* | 12/2019 | Krukar | G06F 3/1222 |
| 2020/0112545 A1 | 4/2020 | Smith et al. | |

OTHER PUBLICATIONS

Aitzhan, Nurzhan Zhumabekuly, and Davor Svetinovic. "Security and privacy in decentralized energy trading through multi-signatures, blockchain and anonymous messaging streams." IEEE Transactions on Dependable and Secure Computing 15.5 (2016): 840-852. (Year: 2016).*
Fotiou, Nikos, and George C. Polyzos. "Decentralized name-based security for content distribution using blockchains." 2016 IEEE Conference on Computer Communications Workshops (Infocom Wkshps). IEEE, 2016. (Year: 2016).*
Buterin, Vitalik, "A Next Generation Smart Contract and Decentralized Application Program", Ethereum White Paper, available at: https://blockchainlab.com/pdf/Ethereum_white_paper-a_next_generation_smart_contract_and_decentralized_application_platform-vitalik-buterin.pdf (Year: 2013).
"Is Blockchain the Answer to E-voting? Nasdaq Believes So", Market Insite, Jan. 23, 2017, availabe at https://business.nasdaq.com/marketinsite/2017/Is-Blockchain-the-Answer-to-E-voting-Nasdaq-Believes-So.html.
Bessani, Alysson "State Machine Replication for the Masses with BFT-SMaRt", Jun. 23-26, 2014 IEEE Computer Society Washington, DC, USA.
Cecchetti, Ethan, et al. "Solidus: Confidential distributed ledger transactions via PVORM." Proceedings of the 2017 ACM SIGSAC Conference on Computer and Communications Security. ACM, 2017. (Year: 2017).
"Counterparty introduces truly trustless games on the blockchain", Jul. 2014, available at http://counterparty.io/news/introducing-fully-trustless-games-on-block.
Dodis, Y., "Introduction of Cryptography—Lecture 14", Apr. 25, 2012, pp. 1-14.
Egelund-Muller, B., Elsman, M., Henglein, F., and 0. Ross, 2016, "Automated Execution of Financial Contracts on Blockchains", Working Paper, University of Copenhagen.
Eha, Brian Patrick, "Who owns what, really? In securities, Delaware may soon clear things up", Jul. 5, 2017, available at https://www.americanbanker.com/news/who-owns-what-really-in-securities-delaware-may-soon-clear-things-up.
Ethereum Homestead Documentation, Release 0.1, Dated Mar. 1, 2017, Downloaded from: https://media.readthedocs.org/pdf/ethereum-homestead/latest/ethereum-homestead.pdf on Aug. 20, 2017. (Year: 2017).
Finra, Distributed Ledger Technology: Implications of Blockchain for the Securities Industry, 2017, available at http://www.finra.org/sites/defualt/files/FINRA Blockchain Report.pdf.
Harvey, C., "Cryptofinance", 2016, available at SSRN: https://ssrn.com/abstract=2438299.
International Search Report and Written Opinion issued in PCT App. No. PCT/US2018/041052, dated Nov. 16, 2018.
Irrera, Anna, "Norther Trust users blockchain for private equity record-keeping", Feb. 21, 2017 available at https://www.reuters.com/article/nthern-trust-IBM-blockchain-idUSL1N1G61TX.
Irrera, Anna and Kelly, Jemima, "London Stock Exchange Group tests blockchain for private company shares", Jul. 19, 2017, available at https://www.reuters.com/article/us-lse-blockchain/london-stock-exchange-group-tests-blockchain-for-private-company-shares-idUSKBN1A40ME.

(56) References Cited

OTHER PUBLICATIONS

Kharpal, Arjun, "Nasdaq to trial blockchain voting for shareholders", Feb. 12, 2016, available at https://www.cnbc.com/2016/02/12/nasdaq-to-trial-blockchain-voting-for-shareholders.html.

Klayman, Joshua Ashley, Pexk, Geoffrey R., and Wojciechowski, Mark S., "Why The Delaware Blockchain Initiative Matters To All Dealmakers", Sep. 20, 2017, available at https://www.forbes.com/sites/groupthink/2017/09/20/why-the-delaware-blockchain-initiative-matters-to-all-dealmakers/#724fa5b67550.

Klems, Markus, et al. "Trustless intermediation in blockchain-based decentralized service marketplaces." International Conference on Service-Oriented Computing. Springer, Cham, 2017. (Year: 2017).

Lamport, Leslie, "Time, Clocks, and the Ordering of Events in a Distributed System", Jul. 1978, available at https://www.microsoft.com/en-us/research/wp-content/uploads/2016/12/Time-Clocks-and-the-Ordering-of-Events-in-a-Distributed-System.pdf.

Metz, Cade, "SEC Approves Plan to Issue Stock via Bitcoin's Blockchain", Dec. 15, 2015, available at https://www.wired.com/2015/12/sec-approves-plan-to-issue-company-stock-via-the-bitcoin-blockchain.

Mullin, Shepperd, "Taking Stock in Blockchains", Venture Law Blog, Jun. 9, 2017, available at https://www.venturelawblog.com/other/blockchain.

Nakamoto, S., A Peer-to-Peer Electronic Cash System, White Paper, 2008, available at https://bitcoin.org/bitcoin.

The National Institute of Standards and Technology's (NIST) 2015 SHA-3 release http://nvlpubs.nist.gov/nistpubs/FIPS/NIST.FIPS.202.pdf, the entirety of which is herein expressly incorporated by reference for all purposes.

Neisse, Ricardo, Gary Steri, and Igor Nai-Fovino. "A blockchain-based approach for data accountability and provenance tracking." Proceedings of the 12th International Conference on Availability, Reliability and Security. ACM, 2017. (Year: 2017).

Noether, Shen, "Ring Confidential Transactions", Feb. 2016, Monero Research Lab, Research Bulletin.

Pinea, A and W. Ruttemberg, "Distributed ledger technologies in securities post-trading: Revolution or evolution?" Apr. 2016, Occasional Paper Series of the European Central Bank, available at https://www.ecb.europa.eu/pub/pdf/scpops/ecbopll 72.en.pdf.

Rizzo, Pete, "Hands On With Linq, Nasdaq's Private Markets Blockchain Project", Nov. 21, 2015, available at https://www.coindesk.com/hands-on-with-linq-nasdaqs-private-markets-blockchain-project.

Solidity Documentation, Release 0.4.4 dated Feb. 13, 2017, retrieved from: https://solidity.readthedocs.io/en/v0.4.4/introduction-to-smart-contracts.html on Aug. 15, 2018. (Year: 2017).

Tinianow, Andrea and Long, Caitlin, "Delaware Blockchain Initiative: Transforming the Foundational Infrastructure of Corporate Finance", Mar. 16, 2017, available at https://corpgov.law.harvard.edu/2017/03/16/delaware-blockchain-initiative-transforming-the-foundational-infrastructure-of-corporate-finance.

Tinianow, Andrea, Smith, Mark, Long, Caitlin, and Santori, Marco, "Delaware's 2017 Resolution: Make Blockchain a Reality", Jan. 3, 2017, available at https://www.coindesk.com/what-expect-delaware-blockchain-initiative-2017.

Udris, Jonas, "Using Blockchain Technology for Limited Company Shares Management", Miner One, Jan. 18, 2018, available at https://medium.com/@minerone.io/using-blockchain-technology-for-limited-company-shares-management-cd8c344c2954.

UK Government Office for Science, 2016, Distributed Ledger Technology: Beyond the Block Chain, available at https://www.gov.uk/government/... data/.../gs-16-1-distributed-1 edgertechnology. Pdf.

Yermack, David, "Corporate Governance and Blockchains", National Bureau of Economic Reasearch, Dec. 2015, available at https://www.nber.org/papers/w21802.pdf.

Zhang, Peng, et al. "Metrics for assessing blockchain-based healthcare decentralized apps." 2017 IEEE 19th International Conference on e-Health Networking, Applications and Services (Healthcom). IEEE, 2017. (Year: 2017).

\* cited by examiner

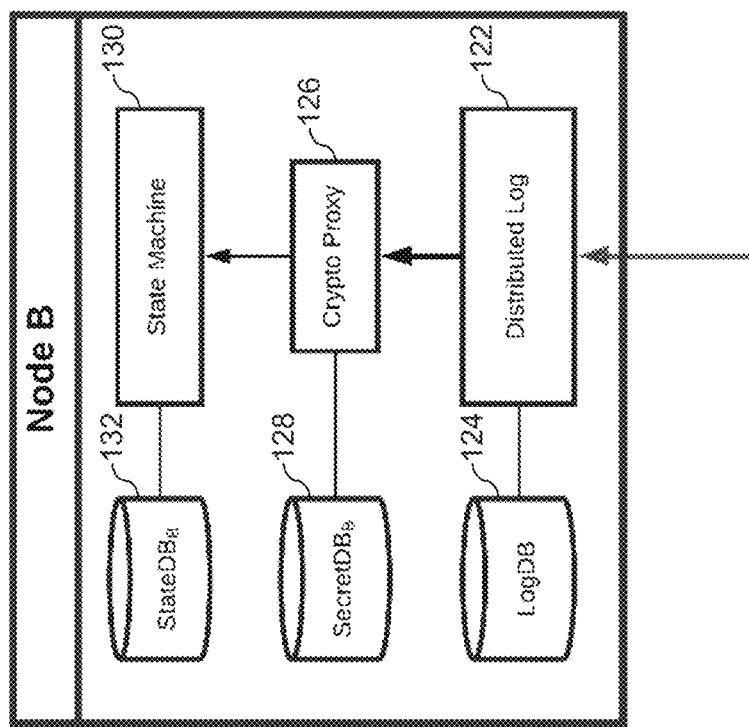
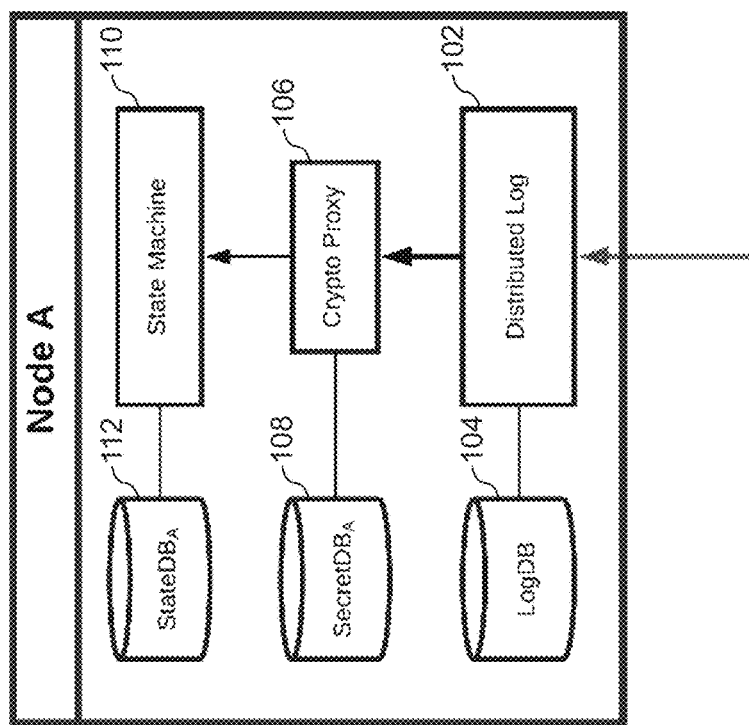
FIG. 1A

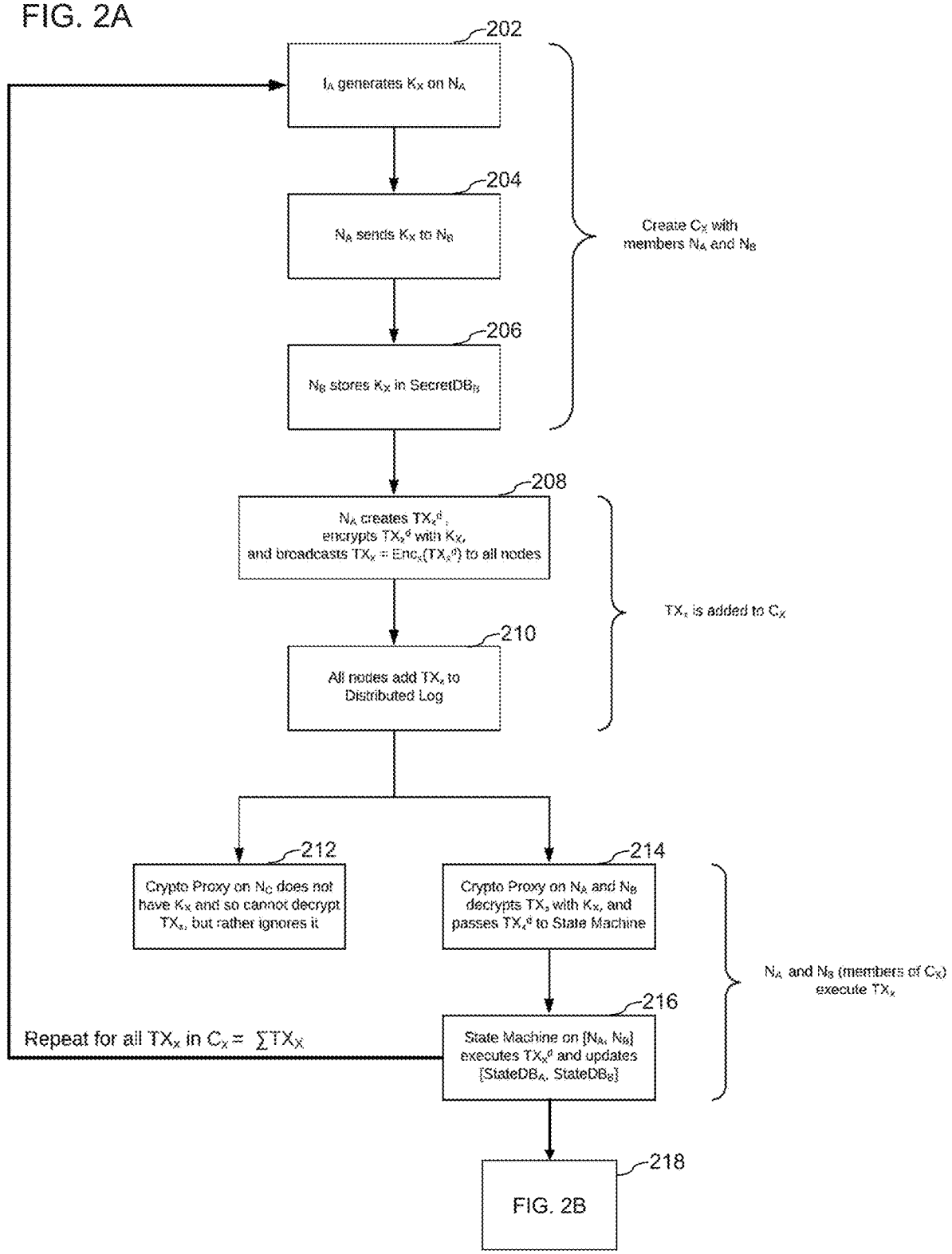

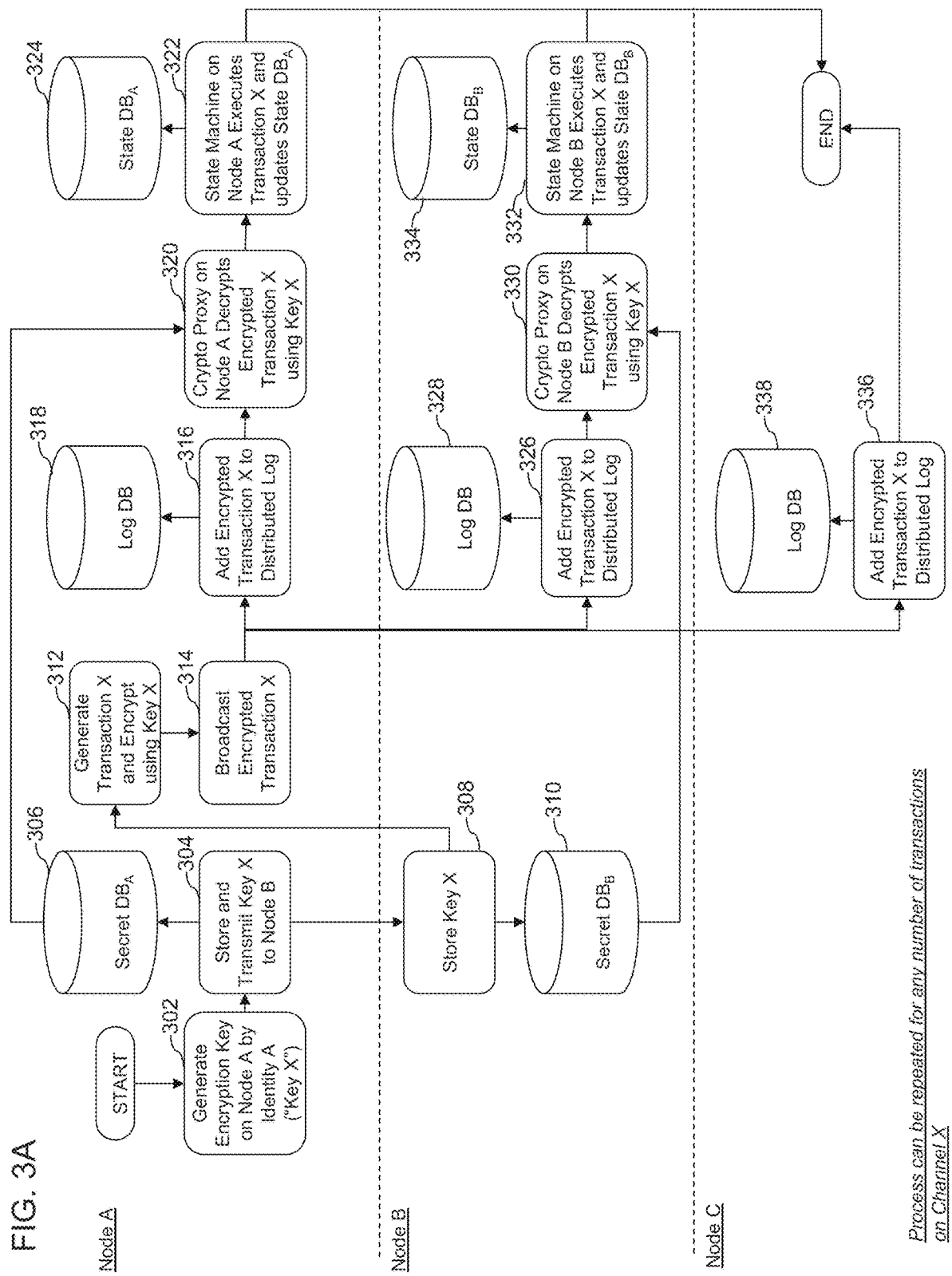

Node A and Node B are in Channel X
Node C alone is in Channel Y

| Distributed Log | Node A | Node B | Node C |
|---|---|---|---|
| | $\sum TX = \sum TX_x + TX_y + \ldots =$ $TX_1, TX_2, TX_3, TX_4, TX_5, TX_6, \ldots$ | $\sum TX = \sum TX_x + TX_y + \ldots =$ $TX_1, TX_2, TX_3, TX_4, TX_5, TX_6, \ldots$ | $\sum TX = \sum TX_x + TX_y + \ldots =$ $TX_1, TX_2, TX_3, TX_4, TX_5, TX_6, \ldots$ |
| StateDB (Channel X) | $State_{x,i} = Execute(\sum_i TX_x = TX_1, TX_4, TX_5, \ldots, TX_i)$ | $State_{x,i} = Execute(\sum_i TX_x = TX_1, TX_4, TX_5, \ldots, TX_i)$ | Null |
| StateDB (Channel Y) | Null | Null | $State_{y,j} = Execute(\sum_j TX_y = TX_2, TX_3, TX_6, \ldots, TX_j)$ |

FIG. 4A

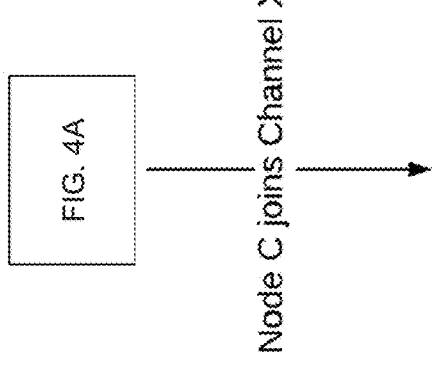

FIG. 4A

Node C joins Channel X

Node A, Node B and Node C are in Channel X
Node C alone is in Channel Y

| Distributed Log | Node A | Node B | Node C |
|---|---|---|---|
| | $\sum TX = \sum TX_x + TX_y + ... =$ $TX_1, TX_2, TX_3, TX_4, TX_5, TX_6, ...$ | $\sum TX = \sum TX_x + TX_y + ... =$ $TX_1, TX_2, TX_3, TX_4, TX_5, TX_6, ...$ | $\sum TX = \sum TX_x + TX_y + ... =$ $TX_1, TX_2, TX_3, TX_4, TX_5, TX_6, ...$ |
| StateDB (Channel X) | $State_{x,i} = Execute(\sum_i TX_x = TX_1, TX_4, TX_5, ..., TX_i)$ | $State_{x,i} = Execute(\sum_i TX_x = TX_1, TX_4, TX_5, ..., TX_i)$ | $State_{x,i} = Execute(\sum_i TX_x = TX_1, TX_4, TX_5, ..., TX_i)$ |
| StateDB (Channel Y) | Null | Null | $State_{y,j} = Execute(\sum_j TX_y = TX_2, TX_3, TX_5, ..., TX_j)$ |

METHODS, SYSTEMS, AND DEVICES FOR ENCRYPTED ELECTRONIC STORAGE AND CONFIDENTIAL NETWORK TRANSFER OF PRIVATE DATA THROUGH A TRUSTLESS DISTRIBUTED LEDGER TECHNOLOGY SYSTEM

CROSS-REFERENCE TO RELATED APPLICATIONS

This application is a continuation of U.S. patent application Ser. No. 16/392,473 filed Apr. 23, 2019, and titled METHODS, SYSTEMS, AND DEVICES FOR ENCRYPTED ELECTRONIC STORAGE AND CONFIDENTIAL NETWORK TRANSFER OF PRIVATE DATA THROUGH A TRUSTLESS DISTRIBUTED LEDGER TECHNOLOGY SYSTEM, which is a continuation of U.S. patent application Ser. No. 16/213,251 filed Dec. 7, 2018, and titled METHODS, SYSTEMS, AND DEVICES FOR ENCRYPTED ELECTRONIC STORAGE AND CONFIDENTIAL NETWORK TRANSFER OF PRIVATE DATA THROUGH A TRUSTLESS DISTRIBUTED LEDGER TECHNOLOGY SYSTEM, which claims the benefit of U.S. Provisional Application No. 62/596,573 filed Dec. 8, 2017, and titled APPARATUSES, METHODS, AND SYSTEMS FOR TRUSTLESS SHARING ON PRIVATE DATA ON A BLOCKCHAIN, and claims the benefit of U.S. Provisional Application No. 62/596,580 filed Dec. 8, 2017, and titled APPARATUSES, METHODS, AND SYSTEMS FOR TRUSTLESS SHARING ON PRIVATE DATA ON A BLOCKCHAIN, and the foregoing applications are hereby incorporated by reference in their entirety, specifically the systems, methods, and devices for storing and transferring data via trustless distributed ledger technology system.

BACKGROUND

Field

Embodiments of the invention relate to the field of distributed ledger technology, and, in particular, to methods, systems, and devices for the electronic storage and network transfer of private data through a trustless distributed ledger system.

Description

With the development of new technologies, distributed ledger systems, such as blockchains, are useful for storing and transferring data across an electronic network using trustless systems while enabling verification of the data. For example, users of cryptocurrency can utilize a distributed ledger system to keep track of transactions by storing such transaction data across a network of computing systems that are not under the central command of a single server and/or authority. Without a central command server and/or authority, the computing systems operating within the network are considered trustless in the sense that the computing systems are acting independently. To ensure the consistency of the data across the entire distributed ledger system network, all computing systems operating within the distributed ledger system network must process and store the data that the network system receives such that the data is accessible to all participants. Despite such advancements, there does not exist a mechanism for the private sharing of data on a distributed ledger system.

SUMMARY

In some embodiments, a trustless decentralized distributed networked node system for selectively sharing data across a plurality of nodes while maintaining consistency of the data across the plurality of nodes comprises: a first channel operating on at least a first node that is part of the plurality of nodes, the first channel comprising a first set of transactions encrypted with a first encryption key, wherein the first set of transactions is broadcasted and stored in the plurality of nodes in encrypted form; the plurality of nodes forming a trustless decentralized distributed networked node system; the first channel comprising a first set of one or more participants with permission to use the first encryption key, wherein the first encryption key enables the first set of one or more participants to decrypt the first set of transactions; a second channel operating on at least a second node that is part of the plurality of nodes, the second channel comprising a second set of transactions encrypted with a second encryption key, wherein the second set of transactions are broadcasted and stored in the plurality of nodes in encrypted form; the second channel comprising a second set of one or more participants with permission to use the second encryption key, wherein the second encryption key enables the second set of one or more participants to decrypt the second set of transactions; at least the second node configured to receive a new transaction encrypted with the second encryption key, the new transaction comprising a set of inputs, the set of inputs comprising the first encryption key and at least one operation, the at least one operation requiring access to the first set of transactions encrypted with the first encryption key; at least the second node configured to execute the new transaction by using the first encryption key to decrypt the first set of transactions to generate data for executing the at least one operation to calculate state information for the second channel; and at least the second node configured to produce and store the state information for the second channel in the second node.

In some embodiments, each of the first node and the second node comprises a log database for storing the first set of transactions in encrypted form and the second set of transactions in encrypted form in identical order. In some embodiments, the first node further comprises: a crypto proxy for decrypting the first set of transactions using the first encryption key; a state machine for executing the decrypted first set of transactions to obtain state information for the first channel; and a state database for storing the obtained state information for the first channel.

In some embodiments, the second node further comprises: a crypto proxy for decrypting the new transaction using the second encryption key to obtain the at least one operation and the first encryption key, wherein the crypto proxy is further configured to retrieve the first set of transactions in encrypted form from the log database and decrypt the first set of transactions using the first encryption key to generate data for executing the at least one operation; a state machine for replaying the decrypted first set of transactions to obtain state information for the first channel, wherein the state machine is further configured to execute the at least one operation based at least in part on the obtained state information for the first channel to calculate state information for the second channel; and a state database for storing the calculated state information for the second channel.

In some embodiments, each of the first node and the second node further comprises a state database for storing state information, wherein the state database of the first node comprises state information for the first channel but not the second channel, and wherein the state database of the second node comprises state information for the first channel and the second channel. In some embodiments, the second channel is dependent on the first channel.

In some embodiments, the first encryption key is a symmetric encryption key. In some embodiments, the second node only has read-only access to the first channel. In some embodiments, the first channel is further configured to disallow further access to the first channel by a participant by freezing the first channel and changing the first encryption key to a third encryption key.

In some embodiments, a trustless decentralized distributed networked node system for selectively sharing data across a plurality of nodes while maintaining consistency of the data across the plurality of nodes comprises: a first channel operating on at least a first node that is part of the plurality of nodes, the first channel generated by a first participant providing an encryption key to a second participant, the first participant operating on at least a first node of the plurality of nodes, the second participant operating on at least a second node of the plurality of nodes; the plurality of nodes forming a trustless decentralized distributed networked node system; the first channel configured to receive a first transaction generated by either the first or second participants, the first channel configured to encrypt the first transaction and broadcast the encrypted first transaction to the plurality of nodes for storage on the plurality of nodes, the first transaction encrypted by the encryption key to enable participants with access to the encryption key to decrypt and execute the first transaction on the plurality of nodes; the first channel configured to permit a third participant with access to the encryption key to decrypt and execute the encrypted first transaction through the trustless decentralized distributed networked node system to calculate state information for the first channel, the third participant operating on at least a third node of the plurality of nodes, wherein the third participant receives access to the encryption key from either the first participant or the second participant; and the first channel configured to disallow a fourth participant without access to the encryption key to decrypt or execute the encrypted first transaction, the fourth participant operating on at least a fourth node of the plurality of nodes.

In some embodiments, providing the encryption key by the first participant to the second participant comprises: encrypting by the first participant the encryption key with a public key of the second participant; and generating and broadcasting by the first participant a transaction to the plurality of nodes, wherein the second participant decrypts the encrypted encryption key using the private key of the second participant. In some embodiments, providing the encryption key by the first participant to the second participant comprises sending the encryption key directly to the second participant.

In some embodiments, each of the first node, the second node, the third node, and the fourth node comprises a log database for storing the first set of transactions in encrypted form in identical order. In some embodiments, each of the first node and the second node further comprises: a crypto proxy for decrypting the first set of transactions using the encryption key; a state machine for executing the decrypted first set of transactions to obtain state information for the first channel; and a state database for storing the obtained state information for the first channel. In some embodiments, the third node further comprises: a crypto proxy for decrypting the first set of transactions using the encryption key; a state machine for replaying the decrypted first set of transactions to obtain state information for the first channel; and a state database for storing the obtained state information for the first channel.

In some embodiments, the third node further comprises a secret database having the encryption key stored thereon. In some embodiments, the state information for the first channel obtained by replaying the decrypted first set of transactions by the state machine on the third node is identical to the state information for the first channel obtained by executing the decrypted first set of transactions by the state machine on the first node or the second node. In some embodiments, each of the third node and the fourth node further comprises a state database for storing state information, wherein the state database of the third node comprises state information for the first channel, and wherein the state database of the fourth node does not comprise state information for the first channel.

In some embodiments, the encryption key is a symmetric encryption key. In some embodiments, the first channel is further configured to disallow further access to the first channel by a participant by freezing the first channel and changing the encryption key to another encryption key.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIG. 1A is a schematic diagram illustrating an example embodiment(s) of nodes in the network and state machine replication;

FIG. 2A is a flowchart illustrating an example embodiment(s) of private or controlled sharing of information on a distributed ledger through an independent secure channel;

FIG. 3A is a flowchart illustrating an example embodiment(s) of private or controlled sharing of information on a distributed ledger through an independent secure channel;

FIG. 4A is a schematic diagram illustrating an example embodiment(s) of controlled sharing of information on a distributed ledger;

FIG. 4B is a schematic diagram illustrating an example embodiment(s) of controlled sharing of information on a distributed ledger;

DETAILED DESCRIPTION

Figure 1B:
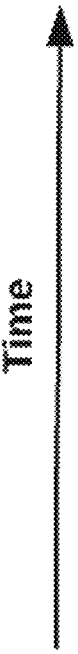
FIG. 1B is a schematic diagram illustrating an example embodiment(s) of data stored on a Log Database and data stored on a State Database.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions. In addition, embodiments of the inventions can comprise several novel features and no single feature is solely responsible for its desirable attributes or is essential to practicing the inventions herein described.

In some embodiments, systems, methods, and devices disclosed herein enable trusted sharing of private data and/or transactions via a distributed ledger, while maintaining data consistency properties. Some embodiments described herein provide and utilize one or more independent and/or dependent channels. In particular, in some embodiments, one or more independent and/or dependent channels can exist on a single distributed ledger, wherein the participants or nodes that are members of a particular channel can view and access the information in a given network transaction. To other participants or nodes not on the particular channel, however, only an encrypted or redacted version of the information can be viewable, thereby not disclosing the transaction information to such participants or nodes. In some embodiments, consistency properties may be preserved even in the presence of this selective sharing of transaction information with proofs of validity, such as transaction replay from a shared log containing encrypted or redacted versions of the same information, or built on cryptographic techniques.

In some embodiments, the systems disclosed herein utilize state machine replication, which is a general method for implementing fault-tolerant services in a distributed system/network. The replicated state machine (RSM) model can guarantee that any two nodes in the network that access the same set of data, process the same set of transactions and run the same deterministic code will reach the same state. However, the RSM model can break down in the presence of privacy in a decentralized network, where individual nodes may access different sets of data, process different sets of transactions, and reach different states (hence inconsistent view of the states). Accordingly, there can be a conflict between consistency and privacy in a decentralized network.

To address this possible conflict, some embodiments of the systems disclosed herein are configured to be an modification to the RSM model to achieve both consistency and privacy in a decentralized network and on a distributed ledger. As such, some embodiments described herein comprise certain features of both an RSM model and distributed ledgers.

In some embodiments, the systems, methods, and devices disclosed herein are configured to enable trusted sharing of private data and/or transactions via a distributed ledger technology. In some embodiments, the distributed ledger technology can be a public and/or a private distributed ledger technology. In some embodiments, the systems disclosed herein are configured to utilize encryption to encrypt data and/or transactions before storing the information within the distributed ledger technology. In some embodiments, the systems disclosed herein are configured to utilize other mechanisms for securing the data and/or transactions before storing the information within the distributed ledger technology. In some embodiments, some network participants that can access the distributed ledger technology will be able to see the existence of the data/transaction but will not be able to read the actual data/transaction stored in the distributed ledger technology because the actual data/transaction is encrypted (or otherwise obscured or hidden or made inaccessible) before it is stored in the distributed ledger technology. In some embodiments, participants that have access to the encryption key used for encrypting the transaction data can access and read the encrypted transaction data that is stored in the distributed ledger technology. In some embodiments, the foregoing encryption key or pair of encryption keys for encrypting transaction data before storing such data on the distributed ledger enables the trusted sharing of private data on a distributed ledger technology, whether the distributed ledger is a public or a private distributed ledger.

For example, a first participant can utilize the systems disclosed herein to encrypt data and/or transaction using an encryption key and publish and/or store the encrypted data on a distributed ledger, such as a blockchain. In this example, a second participant with access to the encryption key can be configured to access the encrypted data/transaction stored on the distributed ledger and use the encryption key to decrypt the transaction data in order to read the private data/transaction information. By publishing the encrypted transaction data, participants of the systems disclosed herein can take advantage of the ability to ensure that the data/transaction is consistent across the entire distributed ledger system. As such, in some embodiments, the systems disclosed herein provide a technical solution to allow private and/or controlled sharing of data/information among certain nodes and/or identities on a distributed ledger with data/information consistency.

In some embodiments, the use of the systems disclosed herein can create one or more secure and/or private channels within the distributed ledger. In some embodiments, such secure channels can be utilized for trusted sharing of private data between selected participants that have access to the encryption key used for encrypting and decrypting the transaction data that is stored in the distributed ledger. Further, such secure channels can also be used for preventing participants that do not have access to the encryption key from accessing the encrypted transaction information stored on the distributed ledger. Additionally, such secure channels can also be used for allowing the encrypted transaction data to be published throughout the entire distributed ledger thereby ensuring the consistency and/or accuracy of the data throughout the distributed ledger system and allowing the transaction data to be accessed by other authorized participants at a later time. In some embodiments, the systems disclosed herein can generate secure channels, also known as encrypted channels, that comprise one or more transactions that are encrypted using the same encryption key. In some embodiments, participants with access to the same encryption key can create a secure channel and access all the data/transactions stored in the secure channel by using the systems disclosed herein.

In some embodiments, the systems disclosed herein can comprise secure channels that can be independent channels and/or interdependent or dependent channels. In some embodiments, an independent channel can comprise transaction data that does not depend upon any data and/or transaction stored in a second secure channel, and/or does not affect any data and/or transaction stored in a second secure channel. In some embodiments, an interdependent or dependent channel can comprise a transaction that relies upon data and/or a transaction stored in a second secure channel, and/or can affect data and/or a transaction stored in a second secure channel.

In some embodiments, the systems disclosed herein can be configured to create a secure channel by generating an identity for a particular participant, wherein the identity is a network-wide unique identifier that can map to a set of cryptographic keys that the identity is associated with. In some embodiments, a first identity can create a secure channel by generating an encryption key, and provide the encryption key to a second identity. By sending the encryption key to the second identity, the first and second identities can use the secure channel to store and/or access encrypted data/transaction by utilizing the encryption key. In some embodiments, the first identity can generate data/transactions and encrypt such data/transactions using the encryption key in order for the system to store such encrypted data/transactions in the distributed ledger. Subsequently, the second identity can utilize the encryption key to access and read the transaction data stored in the distributed ledger. In some embodiments, a third identity, which does not have access to the encryption key, can only determine that the encrypted data/transactions exist in the distributed ledger but cannot access and/or read the transaction data.

In some embodiments, the secure channel is a dependent or an interdependent channel wherein an identity can access a first data/transaction in the first secure channel that is stored on the distributed ledger by using the encryption key of the first secure channel but also needs to access a second secure channel stored on the same distributed ledger in order to process the first data/transaction, which is dependent on one or more data/transactions stored in the second secure channel. In some embodiments, the first data/transaction comprises a second encryption key that enables the identity to access the one or more data/transactions stored in the second secure channel.

In some embodiments, the systems disclosed herein can be configured to implement an identity feature in the network. In some embodiments, an identity is a network-wide unique string identifier that maps to a set of cryptographic keys. In some embodiments, the set of cryptographic keys include at least a key pair for encryption and a key pair for signature.

In some embodiments, the systems disclosed herein can be configured to process a first type of transaction, also referred to as RegisterIdentity. In some embodiments, the RegisterIdentity transaction is a transaction message that contains the string representing the identity and the set of cryptographic key pairs associated with this identity, where each cryptographic key pair consists of a public key and a corresponding private key In some embodiments, RegisterIdentity establishes an identity in the network, and in some embodiments, the identity can execute other types of transactions and/or validate transactions posted by other identities.

In some embodiments, all smart-contract level matters (including identity, privacy, and the like) are completely independent of network topology. In some embodiments, an identity is the role that executes various actions/transactions in the network, and there can be multiple identities on a single node. In some embodiments, a node, when processing an action of a given identity, that can originate from another node, cannot tell from what node that action originated or which node hosts a particular identity, and in some embodiments, there may be no way to find out within the protocol. In some embodiments, the system may be configured to potentially sniff network traffic with the appropriate instrumentation in SmartLog etc. to determine what node that action originated or which node hosts a particular identity.

In some embodiments, identities can create encrypted channels, which can be referred to as secure channels as discussed above. In some embodiments, a channel is a sequence of states. In some embodiments, a secure channel is a namespace for executing a set of transactions among a group of identities. In some embodiments, the transactions in a single channel are encrypted with the same key. In some embodiments, independent channels are independent insofar as a transaction in one channel has no effect on any other channel on the distributed ledger. In some embodiments, the set of independent channels can be viewed as a set of independent replicated state machines.

In some embodiments, the systems disclosed herein can be configured to process one, two, three or more transactions for establishing a new secure channel. In some embodiments, the systems disclosed herein can be configured to distribute or electronically transmit the channel encryption key to various identities or participants that are authorized to join (or be part of) the channel. In some embodiments, an identity or participant that is authorized to join a secure channel has the permission and ability to access and/or read data/transactions within the secure channel and/or be able to or be permitted to write transactions to the secure channel.

In some embodiments, the systems disclosed herein can be configured to execute another type of transaction referred to as MakeNewChannel. In some embodiments, the MakeNewChannel transaction is configured to create each new secure channel. In some embodiments, the channel creator is referred to as the owner of the channel. In some embodiments, the owner generates the initial channel encryption key (for example, a symmetric key) and uses this key to encrypt the MakeNewChannel transaction.

In some embodiments, the systems disclosed herein can be configured to execute another type of transaction referred to as SendKey. In some embodiments, the SendKey transaction is configured to allow the owner of a channel to send or electronically transmit the current channel encryption key to an identity or participant that the owner wants to invite to join the channel. In some embodiments, the systems disclosed herein can be configured to use the transaction message to include the channel information (for example, channel name) and/or the channel key. In some embodiments, the systems disclosed herein are configured to encrypt the transaction message using the public encryption key of the identity (which in some embodiments has already been provided in the RegisterIdentity transaction).

In some embodiments, the systems disclosed herein can be configured to generate a public channel wherein all participants in the network can access the data/transactions stored in the channel. In some embodiments, the systems disclosed herein are configured to use RegisterIdentity and SendKey transactions, which can both be posted in the public channel.

In some embodiments, the systems disclosed herein can be configured to establish an identity on a particular node of the network. Therefore, in some embodiments, only that node stores the secrets for the identity, wherein such secrets include the private keys of the identity (for signing and for decryption and/or encryption) and/or the channel keys for all the channels that the identity has joined. In some embodiments, it can be said that a node is able to decrypt a transaction posted in channel A to refer to the fact that the node has a registered identity that belongs to channel A. In some embodiments, the systems disclosed herein are configured such that each node keeps track of which identities have which channel access rights, as many different identities may be registered on a single node. In some embodiments, the systems disclosed herein can be configured such that a node controls which identity's credentials to use for which transaction in the network.

In some embodiments, the systems disclosed herein can be configured such that each transaction is signed by the identity that posts the transaction using its private signing key. In some embodiments, the systems disclosed herein can be configured to omit the signing step. In some embodiments, the systems disclosed herein can be configured to require that each transaction be signed by the identity that posts the transaction using the identity's signing key.

In some embodiments, the systems disclosed herein can be configured to allow for a set of identities associated with a channel A to overlap with a set of identities associated with a channel B.

In some embodiments, the systems disclosed herein can be configured to allow an identity to directly or indirectly correspond to a real-world participant. In some embodiments, the systems disclosed herein can be configured to allow an identity to typically correspond to a real-world participant.

In some embodiments, the systems disclosed herein can be configured to implement independent secure channels, wherein the transactions in different channels are completely independent of each other. However, in certain real application scenarios, it can be possible that in order to process a transaction in a given channel, information about another channel is needed. For example, for managing share ownership in a company, one can want shareholder workflows to be dependent on the information about the company as a whole (for example, total shares outstanding), but such information about particular shareowners' positions should be private. Without channel interdependencies, either every shareholder could see everyone else's positions, or a stock split at the company-level would not be able to affect the shareholder positions.

In some embodiments, the systems disclosed herein can be configured to allow transactions posted in any of the secure channels to depend on the data in a public channel, since information in the public channel is accessible by all members.

In some embodiments, the systems disclosed herein can be configured to allow execution of a transaction that only results in the modification of data associated with a single channel, which can be referred to as a write channel.

In some embodiments, the systems disclosed herein can be configured to process a transaction using data in other channels, which can be referred as a read channel, so long as the data carries a proof of validity.

In some embodiments, the systems disclosed herein can be configured to provide the proof of validity through a set of channel encryption keys for each of the dependent read channels. This can be sufficient to prove the validity of the data since the keys allow us to decrypt past transactions in the dependent channels and verify the transactions. In some embodiments, the foregoing process is called replay. In some embodiments, a proof of validity can take different forms, such as a zero-knowledge proof (ZKP), verifiable computation, authenticated data structures, and the like.

In some embodiments, the systems disclosed herein can be configured to perform another type of transaction referred to as Execute. In some embodiments, the Execute transaction is configured to take all necessary inputs from the read channels and the corresponding channel keys, verify the inputs and execute the code embedded in the transaction. In some embodiments, the transaction message is encrypted using the current channel key.

In some embodiments, the systems disclosed herein can be configured to change channel membership. In some embodiments, the systems disclosed herein can be configured to store a set of identities associated with a particular secure channel wherein the set of identities can be dynamic. In some embodiments, the systems disclosed herein can be configured to allow new identities to be added, and/or to allow existing identities to be removed. In some embodiments, the systems disclosed herein can be configured to revoke an identity's access to future transactions in the channel, which can be accomplished by key rotation.

In some embodiments, the systems disclosed herein can be configured to use key identifiers also referred to as keyId, which can be a string that uniquely identifies each channel key. In some embodiments, security properties can be associated with a key identifier in order to protect the key identifier from being impermissibly modified and/or used and/or transmitted and/or accessed.

In some embodiments, the systems disclosed herein can be configured to implement key rotation using the FreezeChannel transaction and/or the RotateKey transaction.

In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel is the link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This allows the recovery of all past channel keys—when an identity receives the current channel key, it can replay and/or execute all past transactions posted in the channel by retrieving all past channel keys that are stored (in encrypted form) in the RotateKey transactions.

In some embodiments, the systems disclosed herein can be configured to allow for changing channel ownership. In some embodiments, the systems disclosed herein can be configured to allow ownership of a channel to be dynamic or changeable. In some embodiments, the systems disclosed herein can be configured to change channel ownership by utilizing the AddOwner transaction and/or the RemoveOwner transaction.

In some embodiments, the systems disclosed herein can be configured to utilize the AddOwner transaction, wherein the transaction can include the channel name and/or the identity of the owner to be added.

In some embodiments, the systems disclosed herein can be configured to utilize the RemoveOwner transaction, wherein the transaction can include the channel name and/or the identity of the owner to be removed.

In some embodiments, the systems disclosed herein can be configured to allow each transaction to be posted by one of the owners of the channel and/or encrypted with the channel key. In some embodiments, the systems disclosed herein can be configured to allow the creator of the channel to add other identities as an owner; however, such actions can potentially result in the creator losing control of the channel if one of the other owners removes the channel creator from the list of owners and/or rotates the channel key. In some embodiments, the foregoing can be an advantageous feature of the systems disclosed herein.

In some embodiments, the systems disclosed herein can be configured to allow for the reserving of channel names. In some embodiments, the systems disclosed herein can be configured to allow for the use the ReserveIdentifier transaction to avoid the issue of channel name collision, wherein more than one identity desires to use the same channel name.

In some embodiments, the systems disclosed herein can be configured to utilize the ReserveIdentifier transaction, wherein the transaction can be executed together with the MakeNewChannel transaction. In some embodiments, when a channel is created, the state name needs to be reserved so that there cannot be two different channels with the same channel name.

In some embodiments, the systems disclosed herein can utilize the following specifications and/or definitions:
Asymmetric encryption:
ASym.Gen( )->(pk_enc, sk_enc)
ASym.Encrypt(pk_enc, m)=c
ASym.Decrypt(sk_enc, c)=m In some embodiments, the systems disclosed herein can be configured to allow posting encrypted channel keys on the distributed log. In some embodiments, the systems disclosed herein can be configured to use other mechanisms.
Symmetric encryption:
Sym.Gen( )->(key)
Sym.Encrypt(key, m)->c
Sym.Decrypt(key, c)->m Signature:
Sig.Gen( )->(pk_sig, sk_sig)
Sig.Sign(sk_sig, m)->s
Sig.Verify(pk_sig, s, m)->{0,1}

In some embodiments, the systems disclosed herein can use one or more of the following crypto algorithms, among others:
Asymmetric encryption: RSA, Elliptic Curve based asymmetric encryption
Symmetric encryption: AES
Signature: ECDSA, RSA
Hash function: SHA256

In some embodiments, it can be specified how the transaction is composed for each type of transaction (for example, through the generation process mechanism) and/or how transaction is parsed and/or verified by each node (for example, through a verification process mechanism). Some example transaction types and/or algorithm details are provided below.

In particular, to help parse the algorithm specifications below, certain steps that can be common in all the transactions, which may not necessarily be the case, are highlighted.

For example, the transaction message format can be written as follows (note: "xlly" can be used to denote concatenation of the two messages x and y):
m=requestId||identity||specific_message||nonce,
where requestId is a job identifier from a contract and nonce is a (pseudo)random string of length 32 bytes that is unique to each transaction.

For signing, in some embodiments, each transaction message can be signed by the identity who posts the transaction using its private signing key.

For encryption, in some embodiments, for a transaction posted in a secure channel, the signed message can be encrypted using the current channel key, and a key identifier can be attached to the encrypted message so that the key can be easily identified and retrieved during the verification process.

Further, in some embodiments, for SendKey, the payload can be encrypted using the recipient's public key.

In addition, in some embodiments, for a transaction posted in the public channel, the message can be encrypted using the public key of the public channel. In some embodiments, RegisterIdentity, ReserveIdentifier, SendKey are posted in the public channel, and/or all the other transactions are posted in a secure channel. In some embodiments, there can be a special public/private key pair for the public channel.

For owner-only posting, in some embodiments, anyone can post RegisterIdentity, Execute, and SendKey. In some embodiments, all other types of transactions can only be posted by the owner of a channel.

State Machine Replication

In some embodiments, the systems, methods, and devices described herein are configured to utilize state machine replication or a modified version thereof, whether in connection with independent or dependent channels. In other words, in some embodiments, one or more features/processes described herein for state machine replication can be used for and/or in combination with one or more features/processes described herein for independent channels and/or dependent or interdependent channels. In some embodiments, one or more processes described herein relating to state machine replication can allow for and/or facilitate controlled and private sharing of data and information while maintaining data and information consistency on a distributed ledger.

FIG. 1A illustrates an example embodiment(s) of nodes in the network and state machine replication. As illustrated in FIG. 1A, in some embodiments, each of the nodes on the system can comprise a Distributed Log 102, 122. In other words, the same Distributed Log 102, 122 can exist on every node on the system, which can include Nodes A and B in the illustrated example. Nodes A and B can be the same node and/or different nodes. In some embodiments, one or more identities can be present on each node.

In some embodiments, the Distributed Log 102, 122 can be shared and ordered identically among one or more and/or all of the nodes on the system. In other words, in some embodiments, the same sequence of operations and how one operation depends upon the previous operation(s) can be tracked by every node on the distributed ledger system or network to guarantee and maintain data/information consistency. For example, every arbitrary transaction in the Distributed Log or a set thereof ("$\Sigma TX_i$") can be logged in the Distributed Log 102, 122 in the same order on every node in the system, including Node A and Node B. In some embodiments, every arbitrary transaction in the Distributed Log ("$\Sigma TX_i$") can be encrypted.

In some embodiments, each or some nodes on the system, such as Node A and Node B, can comprise a Log Database 104, 124 for storing the contents or transactions logged in the Distributed Log, such as $\Sigma TX_i$. In some embodiments, the same encrypted set of arbitrary transactions ("$\Sigma TX_i$") can be stored in the Log Database 104, 124 of every node on the system, including Nodes A and B.

In some embodiments, each or some nodes on the system, comprises a Crypto Proxy 106, 126 for encrypting and/or decrypting one or more transactions using an encryption key, such as a symmetric key or asymmetric key. In some embodiments, each or some nodes on the system, comprises a Secret Database 108, 128 for storing one or more encryption keys. The Secret Databases 108, 128 of each or some nodes on the system may have different encryption keys stored thereon. For example, in some embodiments, a Secret Database on Node A 108 ("SecretDB$_A$") can have stored thereon an encryption key for Channel X but not for Channel Y, for instance if Node A is a member of Channel X but not Channel Y. However, a Secret Database on Node B 128 ("SecretDB$_B$") can have stored thereon an encryption key for Channel Y but not for Channel X, for instance if Node B is a member of Channel Y but not Channel X.

In some embodiments, the Crypto Proxy 106, 126 on each or some nodes on the system can be configured to retrieve an appropriate encryption key from its respective Secret Database 108, 128 for encrypting and/or decrypting a particular transaction for a particular channel. For example, if a node is generating a new transaction and/or a new channel, a Crypto Proxy 106, 126 on that node can encrypt the new transaction using an encryption key for that channel, which can be stored on the Secret Database 108, 128 of that node. Further, in some embodiments, a Crypto Proxy 106, 126 on a node may decrypt an encrypted transaction on the Distributed Log 102, 122 if the node has stored in its Secret Database 108, 128 the applicable encryption key for that transaction and channel. If so, then a Crypto Proxy 106, 126 on the node may retrieve an encrypted transaction from the Distributed Log 102, 122 or Log Database 104, 124 and also retrieve the applicable encryption key from the Secret Database 108, 128 on that node and decrypt the transaction.

In some embodiments, each or some nodes on the system, comprises a State Machine 110, 130 for executing one or more transactions that have been decrypted. In some embodiments, each or some nodes on the system, comprises a State Database 112, 132 for storing state information obtained by executing one or more decrypted transactions. The State Databases 112, 132 of each or some nodes on the system may have different states stored thereon for one or more channels. For example, in some embodiments, a State Database 112 on Node A ("StateDB$_A$") can have stored thereon up-to-date state information for Channel X but not for Channel Y, for instance if Node A is a member of Channel X but not Channel Y. However, a State Database 132 on Node B ("StateDB$_B$") can have stored thereon up-to-date state information for Channel Y but not for Channel X, for instance if Node B is a member of Channel Y but not Channel X.

In some embodiments, the State Machine 110, 130 on each or some nodes on the system can be configured to retrieve a decrypted transaction from its respective Crypto Proxy 106, 126 and execute the decrypted transaction for a particular channel. In some instances, if a transaction is not encrypted in the first place, for example because there is no reason to privately share that transaction among only a select number of nodes, the State Machine 110, 130 on every node on the system can be configured to execute the transaction to reach the same state without need for decryption.

As such, in some embodiments, the system can be configured to utilize a state machine replication scheme or process, in which two inputs are inputted into the state machine on each or some of the nodes on the system. More specifically, in some embodiments, one or more encrypted transactions from a Distributed Log 102, 122 or Log Database 104, 124 can be inputted into a Crypto Proxy 106, 126, which can use an encryption key retrieved from a Secret Database 108, 128 to decrypt the one or more encrypted transactions, if the particular node has the applicable encryption key stored in its Secret Database 108, 128. Then, in some embodiments, the decrypted one or more transactions can be inputted into the State Machine 110, 130 at each or some nodes on the system for execution to obtain the resulting state information. As such, in some instances, only those nodes (and state machines thereon) on the network or system with an applicable encryption key for that transaction (and/or on the particular channel for that transaction) will be able to execute the transaction and obtain the resulting state information for that channel; other nodes not on the channel and without the applicable encryption key may have different state information for the same channel as they are not able to execute the transaction.

Moreover, in some embodiments, for transactions that were never encrypted in the first place, the State Machine 110, 130 on each and every node on the system can be configured to execute such transactions without having its Crypto Proxy decrypt such transactions; as such, for such transaction that were not previously encrypted, all nodes on the system (and state machines thereon) can have the same state information for that transaction or public channel. In some embodiments, transactions that were not previously encrypted prior to broadcasting on the distributed log can be deemed to be on a public channel without any encryption.

In some embodiments, the Log Database 104, 124 on each and every node on the system can comprise the same data/information in the same order. However, in some embodiments, the Secret Database 108, 128 on at least some of the nodes on the system can comprise a set of different encryption key data if these nodes are on a different set of channels. At the same time, in some embodiments, the Secret Database 108, 128 on at least some of the nodes on the system can share at least some of the same encryption key data if these nodes are on at least one common channel.

Also, in some embodiments, the State Database 112, 132 on at least some of the nodes on the system can comprise different state information if these nodes are on a different set of channels. At the same time, in some embodiments, the State Database 112, 132 on at least some of the nodes on the system can share at least some of the same state information for at least one channel if these nodes are on at least one common channel.

In some embodiments, each and every node on the system can comprise identical components of a Distributed Log 102, 122, Log Database 104, 124, Crypto Proxy 106, 126, Secret Database 108, 128, State Machine 110, 130, and State Database 112, 132. In some embodiments, each and every node on the system can comprise at least one or more of the foregoing components but not necessarily all. In some embodiments, each and every node on the system can comprise all of the foregoing identical components but different additional components.

State Information v. Log Information

In some embodiments, one or more encrypted transactions can be broadcasted to all nodes on a distributed ledger system or network. These encrypted transactions can be written/stored on the distributed log by each and every node on the distributed ledger in some embodiments.

Further, in addition to storing these encrypted transactions, in some embodiments, those nodes on the distributed ledger that possess the appropriate encryption key for decrypting a particular encrypted transaction can decrypt the transaction using the encryption key, execute the decrypted transaction according to the program logic, and/or update state information as a result of the execution. In some embodiments, state information is also stored in a database on, attached to, and/or accessible by each node, such as in a State Database. In some embodiments, those nodes on the distributed ledger without the appropriate encryption key will not be able to decrypt or execute the encrypted transaction and as such will not be able to update state information accordingly.

FIG. 1B illustrates an example embodiment(s) of data stored on a Log Database and data stored on a State Database, regardless of whether from utilizing an independent, interdependent or dependent channel, or public channel. In the illustrated example, the top row, denoted $TX_X^j$ refers to arbitrary and encrypted transactions in some channel, Channel X. For example, a First Encrypted Transaction ("$TX_X^1$"), a Second Encrypted Transaction ("$TX_X^2$"), and a Third Encrypted Transaction ("$TX_X^3$") may be generated and broadcasted to nodes on a distributed ledger.

In some embodiments, every node on the distributed ledger can store each encrypted transaction on Channel X, once broadcasted, in a Log Database ("Log DB$^j$"). In other words, the Log Database can have stored thereon a list of transactions that are ever created and broadcasted on the distributed ledger. In particular, in the illustrated example, after the First Encrypted Transaction is broadcasted, the First Encrypted Transaction $TX_X^1$ can be stored on the Log Database. For illustrative purposes, the First Encrypted Transaction can contain the information x=0. Similarly, in the illustrated example, after the Second Encrypted Transaction is broadcasted, then the Log Database at that time can have stored thereon both the First Encrypted Transaction $TX_X^1$ and the Second Encrypted Transaction $TX_X^2$. For illustrative purposes, the Second Encrypted Transaction can contain the information x+=3. Further, in the illustrated example, after the Third Encrypted Transaction is broadcasted, then the Log Database at that time can have stored thereon both the First Encrypted Transaction $TX_X^1$, the Second Encrypted Transaction $TX_X^2$, and the Third Encrypted Transaction $TX_X^3$. For illustrative purposes, the Third Encrypted Transaction can contain the information x+=5.

In some embodiments, those nodes with an applicable encryption key to decrypt the encrypted transactions will be able to decrypt and execute the transaction and update the State Database on that node with the updated state information for Channel X. In the illustrated embodiment, "$State_X^j$" denotes the contents of the State Database corresponding to Channel X as of Transaction j in Channel X. For example, a node with an encryption key to decrypt the First Encrypted Transaction $TX_X^1$ will be able to decrypt and execute the First Encrypted Transaction to obtain the state information x=0, which can be stored in the State Database of that node. In other words, the State of Channel X after the first transaction ("$State_X^1$") can be x=0.

Further, after the Second Encrypted Transaction $TX_X^2$ is broadcasted, a node with an encryption key to decrypt the Second Encrypted Transaction $TX_X^2$ can decrypt and execute the same to obtain the state information x=3 (by executing x+=3 to the last previous state x=0) for Channel X. In other words, the State of Channel X after the second transaction ("$State_X^2$") can be x=3. Similarly, after the Third Encrypted Transaction $TX_X^3$ is broadcasted, a node with an encryption key to decrypt the Third Encrypted Transaction $TX_X^3$ can decrypt and execute the same to obtain the state information x=8 (by executing x+=5 to the last previous state x=3) for Channel X. In other words, the State of Channel X after the third transaction ("$State_X^3$") can be x=8.

Independent Channel

As described above, generally speaking, one advantage of a distributed ledger technology (DLT) system can be that consistency can be guaranteed across all one or more nodes on the distributed ledger system. In other words, every node on the DLT platform or network can be known to have an identical set of information, at any point in time. However, in order to do so, all information on the distributed ledger can be generally viewable on all nodes on the system, which may not be ideal or acceptable. Rather, it may be desirable to keep certain information private or secret from certain participants, which may not be technically possible on certain existing distributed ledger technologies. As such, applications of DLT can be limited due to the lack of ability to privately share information on a distributed ledger.

One way to address this technical shortcoming of DLTs can be to use pseudonyms to handle anonymity and privacy, as in some cryptocurrency systems. However, there are significant limitations to this solution, as data besides the identities are not hidden, and even the identity information may be leaked this way. Another possible solution can be to split a single distributed ledger into two or more distributed ledgers—either logical or physical—in which only those participants proxy to the same information would be on a same distributed ledger. However, if multiple distributed ledgers are used, then data/information consistency may no longer guaranteed among the plurality of distributed ledgers, thereby negating one of the key technical advantages of distributed ledgers.

As such, to address such technical problems, namely to allow private or controlled sharing of information on a single distributed ledger while preserving consistency of all information among all of the nodes on the distributed ledger, certain systems described herein provide and utilize one or more independent and/or dependent or interdependent channels. In particular, in some embodiments, one or more independent and/or dependent or interdependent channels can exist on a single distributed ledger, wherein participants or nodes on a particular channel are able to view and access the same underlying information of a broadcasted transaction. To other participants or nodes not on the particular channel, however, only an encrypted version of the information can be viewable, thereby not disclosing the underlying information to such participants or nodes not on the channel. At the same time, however, encrypted versions of the same underlying information can be written onto the distributed ledger at every node, thereby maintaining data consistency of the distributed ledger, while allowing controlled and private sharing of information as desired among only certain identities or nodes on the distributed ledger.

In particular, FIG. 2A illustrates an example embodiment(s) of private or controlled sharing of information on a distributed ledger through an independent secure channel. However, certain processes and/or features described in connection with FIG. 2A can also be applicable to dependent or interdependent channels. Referring to FIG. 2A, in some embodiments, a participant or Identity A ("$I_A$") can be on Node A ("$N_A$"), which is part of a distributed ledger network or system. Node B ("$N_B$") and Node C ("$N_C$") can also be part of the same distributed ledger network or system. Nodes A, B, and/or C can be the same node and/or different nodes. In some embodiments, one or more identities can be present on each node.

In some embodiments, Identity A can create private channel, Channel X ("$C_X$") just with members Node A and Node B, but not including Node C. In particular, Identity A can generate an encryption key, which can be a symmetric or asymmetric key, for the new channel. More specifically, in the illustrated example, Identity A can generate Symmetric Key X ("$K_X$") at block 202. In some embodiments, Node A can store Symmetric Key X in a database or a secure database, such as Secret Database A ("SecretDB$_A$") that Node A has access to. In order to create Channel X, in some embodiments, Node A and/or Identity A through Node A can send Symmetric Key X to Node B at block 204. Upon receipt of Symmetric Key X, Node B can store Symmetric Key X in a database or a secure database, such as Secret Database B ("SecretDB$_B$"), on and/or accessible by Node B at block 206. As such, in some embodiments, at this stage, only Nodes A and B have access to Symmetric Key X.

In some embodiments, at block 208, Node A and/or Identity A through Node A can create an unencrypted or decrypted Transaction X ("$TX_x^d$") to add to Channel X at block 208. In other words, this Transaction X can be generated by Node A for sharing only with Node B among all nodes on the distributed ledger network or system. However, prior to broadcasting Transaction X on the distributed ledger network or system, Node A can encrypt Transaction X at block 208 with Symmetric Key X. The encrypted version of Transaction X with Symmetric Key X can be denoted "$Enc_x(TX_x^d)$." In some embodiments, Node A can then broadcast Transaction X in an encrypted form with Symmetric Key X to all nodes on the DLT at block 208.

In some embodiments, all nodes on the distributed ledger network or system can then write the encrypted version of Transaction X to the Distributed Log at block 210, thereby maintaining data/information consistency throughout the whole distributed network/system and nodes thereon. However, not all nodes will be able to decrypt the encrypted version of Transaction X to access the underlying plaintext or information of Transaction X.

For example, in the illustrated example, Node C does not have access to Symmetric Key X. In other words, the Crypto Proxy on Node C may not have Symmetric Key X and therefore cannot decrypt the encrypted version of Transaction X with Symmetric Key X. As such, in some embodiments, Node C can rather simply ignore Transaction X after logging the encrypted version of Transaction X on its Distributed Log for data/information consistency of the distributed ledger at block 212.

In contrast, in the illustrated example embodiment, Node A and Node B have access to Symmetric Key X. In other words, in the illustrated example embodiment, the Crypto Proxy on Node A and the Crypto Proxy on Node B both have Symmetric Key X and therefore are able to decrypt Transaction X previously encrypted with Symmetric Key X at block 214 to access the underlying plaintext or information. After decryption, the decrypted or unencrypted version of Transaction X can be passed by Node A and Node B to the State Machine of each node at block 214. In some embodiments, each State Machine on Node A and Node B can then execute the unencrypted or decrypted version of Transaction X and update the State Database on Node A ("StateDB$_A$") and the State Database on Node B ("StateDB$_B$") for Channel X accordingly at block 216. As such, in this illustrated example, all members of Channel X at this point (i.e., Node A and Node B) have now executed Transaction X.

In some embodiments, one or more processes described herein in connection with FIG. 2A can be repeated for all or a set of one or more transactions in Channel X, which can be denoted "$\Sigma TX_x$."

After creating a particular channel, such as Channel X in the example illustrated in FIG. 2A, it may be in the interest of the initial channel members to extend the channel membership to a new member in order to share the private or controlled information of the channel with another node. As such, in some embodiments, the system allows for addition of new members or nodes to existing channels to expand controlled sharing of information with the new member or node, while still maintaining consistency of information across the distributed ledger.

Figure 2B:
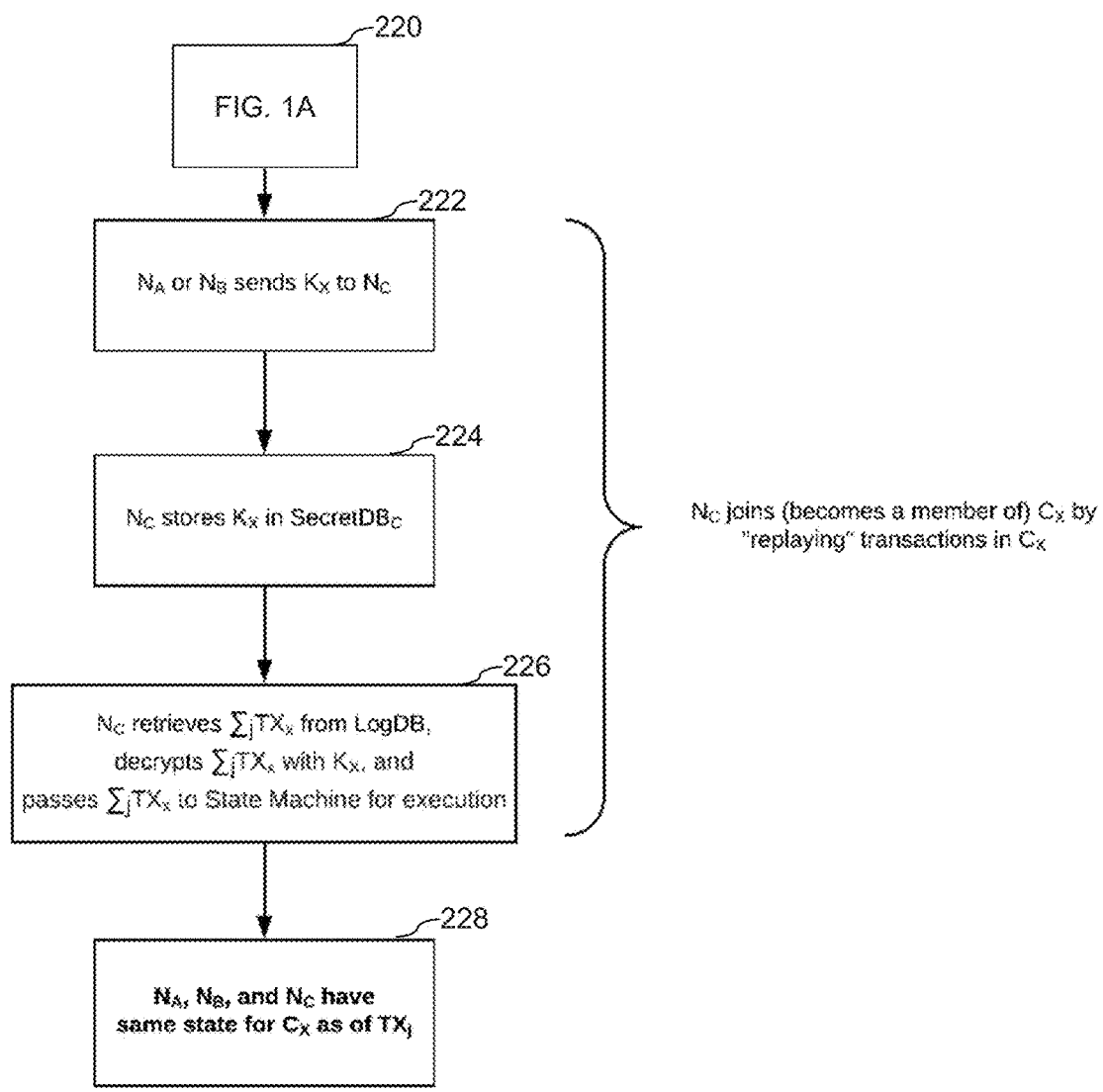
FIG. 2B is a flowchart illustrating an example embodiment(s) of adding a participant or node to an independent secure channel for private or controlled sharing of information on a distributed ledger.

FIG. 2B illustrates an example embodiment(s) of adding a member or node to an independent secure and/or private channel for private or controlled sharing of information on a distributed ledger. However, certain processes and/or features described in connection with FIG. 2B can also be applicable to dependent or interdependent channels. One or more processes described in connection with FIG. 2B can follow one or more processes described in connection with FIG. 2A 220.

As described above, in some example embodiments illustrated in connection with FIG. 2A, at least initially Node A and Node B can be the sole members of Channel X when Channel X is first created. In other words, Node A and Node B can be the only nodes with access to Symmetric Key X when Channel X is initially created. Then, if Node A and/or Node B wish to add Node C, a new member, to Channel X, then either Node A and/or Node B can send Symmetric Key X to Node C ("$N_C$") at block 222. In some embodiments, Node C can then store Symmetric Key X in a database or a secure database, such as Secret Database C ("SecretDB$_C$"), on and/or accessible by Node C at block 224. Nodes A, B, and/or C can be the same node and/or different nodes. In some embodiments, one or more identities can be present on each node.

As previously discussed, in some embodiments, Node C, which is on the distributed ledger, would have been logging an encrypted version of Transaction X, and encrypted versions of other transaction(s) on Channel X if any, on the distributed log. However, as Node C previously did not have access to Symmetric Key X, Node C would not have been able to decrypt the encrypted version of Transaction X or any other transaction(s) on Channel X, if any. Similarly, Node C previously would not have been able to execute Transaction X or any other transaction(s) on Channel X, if any, without Symmetric Key X. However, now that Node C has access to Symmetric Key X, in some embodiments, Node C can now decrypt and execute Transaction X and any other transaction(s), if any, on Channel X. In other words, Node C can now "replay" all transactions previously logged as part of Channel X, using Symmetric Key X, and thus become a member of Channel X.

In particular, in some embodiments, at block 226, Node C can retrieve the set of transactions on Channel X in the distributed log or Log Database ("Log DB") as of the last transaction on Channel X at that time, which can be denoted "$\Sigma_j \ TX_x$," to refer to the set of all transactions logged on Channel X as of the $j^{th}$ transaction on Channel X. In some embodiments, Node C can then decrypt $\Sigma_j \ TX_x$ using Symmetric Key X that it received from either Node A and/or Node B, which Node C or any other non-member node of Channel X previously would not have been able to do. After decryption, in some embodiments, Node C can execute $\Sigma_j \ TX_x$ to determine the resulting state for Channel X and one or more nodes affected by such transactions. For example, in some embodiments, Node C can pass $\Sigma_j \ TX_x$ to a State Machine on Node C for execution at block 226. After execution or replaying the set of transactions previously logged on Channel X, Node C can then have the same state as Node A and Node B for channel X as of the $j^{th}$ transaction on Channel X at block 228.

One or more such processes described in connection with FIG. 1B can be repeated any number of times in order to add one or more additional members to Channel X. As such, in the illustrated example with Nodes A, B, and C, all three nodes, and other nodes on the distributed ledger, always maintained consistent logged data regardless of their membership status in Channel X. In particular, with respect to Channel X, all nodes on the distributed ledger would have always logged encrypted versions of transactions on Channel X on the distributed log or Log Database in some embodiments, thereby maintaining consistency of the distributed ledger. However, in some embodiments, only those member nodes with access to Symmetric Key X would be able to decrypt such logged Channel X transactions and execute them to determine the resulting state for Channel X. As such, the information of each transaction and the resulting state thereof can be selectively shared in a controlled manner with only those members with Symmetric Key X, while maintaining data/information consistency throughout the whole distributed log at all times.

FIG. 3A illustrates another example embodiment(s) of private or controlled sharing of information on a distributed ledger through an independent secure channel. However, certain processes and/or features described in connection with FIG. 3A can also be applicable to dependent or interdependent channels. In the example embodiment(s) illustrated in FIG. 3A, in some embodiments, three or more nodes can be on a distributed ledger, including Node A, Node B, and Node C. Nodes A, B, and/or C can be the same node and/or different nodes. In some embodiments, one or more identities can be present on each node. In some embodiments, every node on the distributed ledger can be configured to write or log the same information, whether encrypted or not, whenever any transaction occurs in order to maintain data/information consistency among all nodes of the distributed ledger.

However, at the same time, in some embodiments, Node A or a participant or identity on Node A may want to create or generate a private information sharing channel on the distributed ledger. In order to do so, a participant or Identity A in some embodiments, can generate an encryption key, "Key X," for a new channel, "Channel X," on Node A at block 302. Key X can be a symmetric key or asymmetric key in some embodiments. In some embodiments, Key X can comprise a pair of encryption and decryption keys.

In some embodiments, at block 304, Node A can store the generated Key X in a secure database that only Node A has access to, which can be denoted Secret DBA 306. In some embodiments, Node A can also transmit Key X to another node on the distributed ledger with whom Identity A would like to share certain private information with. For example, in the illustrated example, Node A can transmit Key X to Node B at block 304 in order to generate or create Channel X for privately sharing information between only Node A and Node B on a distributed ledger that otherwise is designed to share the same information among all nodes on the distributed ledger. In some embodiments, at block 308, Node B can then store Key X in a secure database that only Node B has access to, which can be denoted Secret $DB_B$ 310.

In some embodiments, Node A can generate Transaction X at block 312, in which Transaction X reflects the information that Identity A or Node A wanted to share privately with Node B or one or more participants or identities on Node B but not with other nodes on the distributed ledger. In some embodiments, Node A can also encrypt Transaction X at block 312 using Key X, as only Node A and Node B have access to Key X.

In some embodiments, Node A then broadcasts the encrypted version of Transaction X to all nodes on the distributed ledger at block 314. In some embodiments, as Transaction X is encrypted with Key X, only those nodes or identities with access to Key X would be able to decrypt Key X to decrypt and determine the underlying information. In some embodiments, other nodes or identifies without access to Key X would still log the encrypted version of Transaction X, as would those nodes with Key X, onto the distributed ledger and thereby maintain data/information consistency; however, they would not be able to decrypt or determine the underlying information, thereby effectively controlling private sharing of information on a distributed ledger.

For example, in some embodiments, Node A can add or log Transaction X encrypted with Key X on the Log Database ("Log DB") 318 at block 316. As Node A has access to Key X, Node A can retrieve Key X from Secret DBA 306 and decrypt the encrypted version of Transaction X using Key X at block 320. In some embodiments, Node A can execute Transaction X after decryption using Key X and update the state machine or state machine database at Node A ("State DBA") 324 at block 322 based on the execution of decrypted Transaction X.

As with any other node on the distributed ledger network, in some embodiments, Node B can write Transaction X encrypted with Key X to the Log Database 328 at block 326. As Node B also has access to Key X, Node B can similarly retrieve Key X from Secret $DB_B$ 310 and decrypt the encrypted version of Transaction X using Key X retrieved from its own database at block 330. In some embodiments, Node B can execute Transaction X after decryption using Key X and update its state machine or state machine database at Node B ("State $DB_B$") 334 at block 332 based on the execution of decrypted Transaction X.

As with Node A, Node B, and any other node on the distributed ledger network, in some embodiments, Node C can also write Transaction X encrypted with Key X to the Log Database 338 at block 336. In other words, all nodes on the distributed ledger can be configured to write the same encrypted version of Transaction X to the distributed log. However, unlike Node A and Node B, Node C does not have access to Key X and therefore cannot decrypt the encrypted version of Transaction X or execute Transaction X. Rather, Transaction X encrypted with Key X is simply logged without execution. In some embodiments, this process or one or more processes illustrated in FIG. 3A can be repeated for any number of transactions on Channel X.

As discussed above, circumstances may change such that Node A and/or Node B may want to share information on Channel X with Node C. In other words, a situation may arise in which Node A and/or Node B, who were previously members of Channel X, may want to share all previous and/or all future information on Channel X with a new node that was previously not a member of Channel X, such as Node C. One way to share all previous information with Node C can be to simply send all decrypted versions of previous transactions to Node C; however, this can be both time and computer resource consuming as well as unsafe from a security standpoint, particularly given the fact that Node C is on the distributed ledger with the Channel X transaction(s) as Node A and Node B, albeit in encrypted form.

As such, rather than sending the full history, which Node C already has access to an encrypted version of, in some embodiments, the system can be configured to share Key X with new member node, Node C, and have Node C decrypt and replay previous transaction(s) on Channel X to obtain the same state information for Channel X as Nodes A and B. Further, in some embodiments, for any future transactions on Channel X, Node C can decrypt and execute them in the same manner as Nodes A and B using Key X. However, if Nodes A and B would rather share some new information only between Nodes A and B, but not Node C, then Node A and/or Node B can create a new channel, such as a new independent channel with a new encryption key to be shared only among Nodes A and B but not C.

Figure 3B:
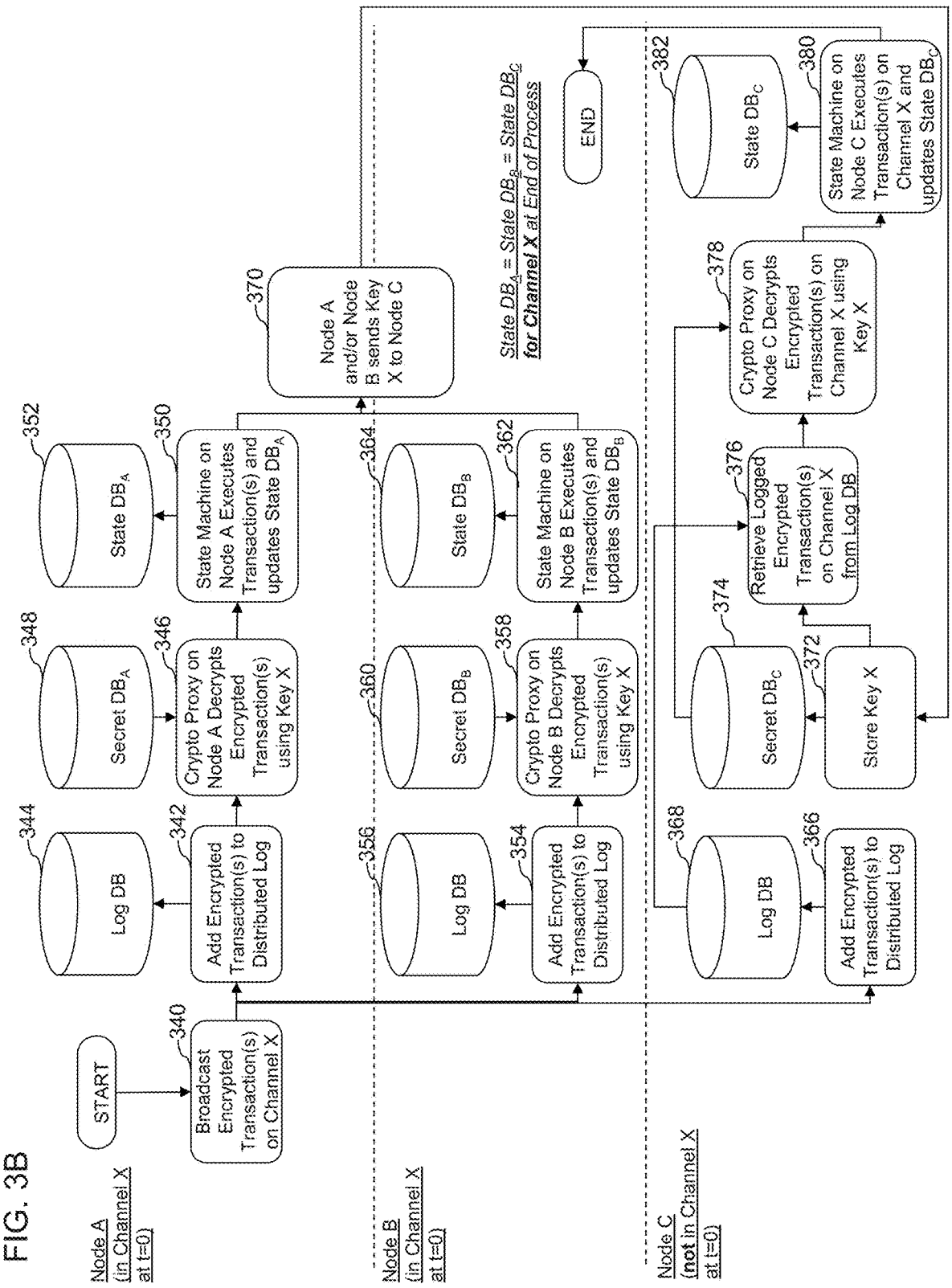
FIG. 3B is a flowchart illustrating an example embodiment(s) of adding a participant or node to an independent secure channel for private or controlled sharing of information on a distributed ledger.

FIG. 3B illustrates an example embodiment(s) of adding a member or node to an independent secure and/or private channel for private or controlled sharing of information on a distributed ledger. However, certain processes and/or features described in connection with FIG. 3B can also be applicable to dependent or interdependent channels. In the example illustrated in FIG. 3B, in some embodiments, Node A, Node B, and Node C can all be nodes on the same distributed ledger network or system. Nodes A, B, and/or C can be the same node and/or different nodes. In some embodiments, one or more identities can be present on each node. However, in some embodiments, initially or at time=0, only Nodes A and B may be members of a particular private information sharing channel, Channel X. Node C may not be on Channel X at least initially at t=0.

In some embodiments, at block 340, Node A can generate and/or broadcast an encrypted version of a transaction(s) on Channel X to all nodes on the distributed ledger network. In some embodiments, the transaction(s) can be encrypted with an encryption key, Key X, which can be shared only among members of Channel X, which may include only Nodes A and B at t=0. Similar to the process described above in connection with FIG. 3A, in some embodiments, all nodes on the distributed ledger, including Nodes A, B, and C, can write or log the encrypted version of the transaction(s) to the distributed log.

In particular, in some embodiments, Node A can write/store the encrypted transaction(s) to the Log Database 344 at block 342. Since Node A is on Channel X and has access to Key X, Node A or a Crypto Proxy on Node A, in some embodiments, can decrypt the encrypted transaction(s) using Key X at block 346. In some embodiments, Node A or the Crypto Proxy on Node A can retrieve Key X from a secure database on Node A 348, which is denoted "Secret DBA." After decryption at block 350, in some embodiments, Node A or a State Machine on Node A can execute the transaction(s) to obtain updated state information for Channel X and update a State Database on Node A, State DBA 352, accordingly.

Similarly, in some embodiments, Node B can write/store the encrypted transaction(s) to its Log Database 356 at block 354. Since Node B is also on Channel X and has access to Key X, Node B or a Crypto Proxy on Node B, in some embodiments, can decrypt the encrypted transaction(s) using Key X at block 358. In some embodiments, Node B or the Crypto Proxy on Node B can retrieve Key X from a secure database on Node B 360, which can be denoted "Secret $DB_B$." After decryption at block 362, in some embodiments, Node B or a State Machine on Node B can execute the transaction(s) to obtain updated state information for Channel X and update a State Database on Node B, State $DB_B$ 364, accordingly. At this point, in some embodiments, the State Database on Node A 352 and the State Database on Node B 364 can comprise the same state information for Channel X as both Nodes A and B were able to decrypt and execute the same transaction(s) on Channel X.

In some embodiments, as with any other node on the distributed ledger network, Node C can also write/store the encrypted transaction(s) to its Log Database 368 at block 366. In contrast to Nodes A and B, however, Node C in the illustrated example is not on Channel X at this point and does not have access to Key X. As such, in the illustrated example, Node C would not be able to decrypt or execute the transaction(s) at this point, but rather ignores it.

However, at some point in time after t=0, Node A and/or Node B may decide to include Node C in Channel X to share the previous transaction(s) on Channel X. In order to do so, in some embodiments, Node A and/or Node B can send Key X to Node C at block 370. After receiving Key X, in some embodiments, Node C can store Key X at block 372 in a secure database on Node C 374, which can be denoted "Secret $DB_C$."

In some embodiments, now that Node C has access to Key X, Node C can decrypt and replay the transaction(s) on Channel X and become proxy to the same information for Channel X as Nodes A and B. In particular, in some embodiments, Node C can retrieve the logged transaction(s) on Channel X encrypted with Key X from the Log Database 368 at block 376.

In some embodiments, Node C or the Crypto Proxy on Node C can retrieve Key X from Secret $DB_C$ 374 and decrypt the transaction(s) on Channel X using Key X at block 378. After decryption at block 380, in some embodiments, Node C or a State Machine on Node C can execute/replay the transaction(s) to obtain updated state information for Channel X and update a State Database on Node C, State $DB_B$ 382, accordingly. At this point, in some embodiments, the State Database on Node A 352, the State Database on Node B 364, and the State Database on Node C 382 can comprise the same state information for Channel X, even though Node C became a member of Channel X at a later point in time compared to Nodes A and B.

Example of Controlled Information Sharing

FIGS. 4A-B illustrate an example embodiment(s) of controlled sharing of information on a distributed ledger. Certain processes and/or features described in connection with FIGS. 4A-4B can be applicable to any and all embodiments described herein, irrespective of whether an independent, interdependent/dependent, or public channel is being utilized.

In the example embodiment illustrated in FIGS. 4A-4B, a distributed ledger can include Nodes A, B, and C. Nodes A, B, and/or C can be the same node and/or different nodes. In some embodiments, one or more identities can be present on each node. On this distributed ledger system or network, three can be at least two channels, Channel X and Channel Y. Further, at least initially, Node A and Node B can be in Channel X but not Channel Y. In addition, at least initially, Node C can be in Channel Y but not Channel X. As such, in some embodiments, a channel can be considered a set of identities and/or nodes. Furthermore, each of the nodes, Nodes A, B, and C, can comprise a Distributed Log and a State Database as described above. Each of Channel X and Y can be either an independent channel or an interdependent channel.

In the illustrated example embodiment, the Distributed Log on all of the nodes can comprise the same information, thereby maintaining data consistency. For example, each of the Distributed Logs on Nodes A, B, and C can comprise a set of all encrypted transactions broadcasted on the distributed ledger on every channel ("$\Sigma TX$"). In particular, each of the Distributed Logs on Nodes A, B, and C can comprise a set of encrypted transactions on Channel X ("$\Sigma TX_x$") and a set of encrypted transactions on Channel Y ("$\Sigma TX_y$"), as well as encrypted transactions on any other channel. $\Sigma TX_x$ and $\Sigma TX_y$ can be subsets of $\Sigma TX$. In the illustrated example, these transactions can include a First Encrypted Transaction ($TX_1$), a Second Encrypted Transaction ($TX_2$), a Third Encrypted Transaction ($TX_3$), a Fourth Encrypted Transaction ($TX_4$), a Fifth Encrypted Transaction ($TX_5$), a Sixth Encrypted Transaction ($TX_6$), or the like, in which the First, Fourth, and Fifth Encrypted Transactions are on Channel X, and the Second, Third, and Sixth Encrypted Transactions are on Channel Y.

In some embodiments, in contrast to the Distributed Log, the information stored on the State Databases on the nodes can be different or the same, depending on which channel each node is a member of. For example, the state information for Channel X stored on the State Databases of Nodes A and B can the same as both of these nodes are in Channel X. However, the State Database of Node C may not comprise any state information or updated state information for Channel X, as Node C is not a member of Channel X and cannot decrypt or execute encrypted transactions on Channel X. Further, the State Database of Node C may comprise state information for Channel Y. However, the State Databases of Nodes A or B may not comprise any state information or updated state information for Channel Y, as Nodes A and B are not members of Channel Y and cannot decrypt or execute encrypted transactions on Channel Y.

In particular, in the illustrated example embodiment, the State Databases on both Nodes A and B can comprise updated state information for Channel X as of the $j^{th}$ transaction or $State_x^j$. This can comprise state information arising from executing the decrypted versions of all transactions on Channel X until the $j^{th}$ transaction, including $TX_1$, $TX_4$, and $TX_5$, or in other words, Execute($\Sigma_j TX_x$). In contrast, the State Database on Node C may not comprise any or updated state information for Channel X, as Node C may not be able to decrypt or execute any of the encrypted transactions for Channel X that were broadcasted. In other words, although the encrypted transactions for Channel X are stored in the Distributed Log on Node C, thereby maintaining consistency of the data, Node C may not have access to the underlying transaction information and/or state information for Channel X.

Similarly, in the illustrated example embodiment, the State Database of Node C can comprise updated state information for Channel Y as of the $j^{th}$ transaction or $State_y^j$. This can comprise state information arising from executing the decrypted versions of all transactions on Channel Y until the $j^{th}$ transaction, including $TX_2$, $TX_3$, and $TX_6$, or in other words, Execute($\Sigma_j TX_y$). In contrast, the State Databases on Nodes A or B may not comprise any or updated state information for Channel Y, as Nodes A and B may not be able to decrypt or execute any of the encrypted transactions for Channel Y that were broadcasted. In other words, although the encrypted transactions for Channel Y are stored in the Distributed Log on both Nodes A and B identical to Node C, thereby maintaining consistency of the data, Nodes A and B may not have access to the underlying transaction information and/or state information for Channel Y.

In some embodiments, Node C may join Channel X. For example, either Node A and/or Node B may provide the encryption key for Channel X to Node C. In some embodiments, the encryption key for Channel X can be sent directly to Node C, for example through a side channel. In some embodiments, the encryption key for Channel X can be sent to Node C through the network, for example by encrypting the Channel X encryption key with a public key of a participant registered on Node C and then broadcasting the Channel X encryption key encrypted with the public key on the distributed ledger as a transaction. As such, in some embodiments, every node on the distributed ledger can write/store this transaction, but may be not be able to decrypt the transaction without the participant's corresponding private key and therefore not be able to obtain the Channel X encryption key. In any event, in some embodiments, Nodes A, B, and C may all be in Channel X, and only Node C may be in Channel Y as illustrated in the example embodiment of FIG. 4B. One or more processes or states depicted in FIG. 4B may follow one or more processes or states depicted in FIG. 4A.

In some embodiments, as described above, the Distributed Log of each of Nodes A, B, and C can comprise the same encrypted version of every transaction broadcasted on the distributed ledger, whether it be for Channel X or Y or another channel. The addition of a new member node to Channel X may not affect the Distributed Log in any way in some embodiments.

However, the State Database on Node C may now include updated state information for Channel X in addition to updated state information for Channel Y. More specifically, in some embodiments, now that Node C is a member of Channel X, Node C may now have access to the encryption key for Channel X and thus be able to decrypt and execute encrypted transactions on Channel X that Node C previously could not. In other words, Node C may now decrypt encrypted transactions on Channel X, including $TX_1$, $TX_4$, and $TX_5$, and execute or replay the same to obtain updated state information for Channel X, which can be stored in the State Database of Node C. As such, in some embodiments, the system allows for adding new parties to a transaction, such as a financial or other transaction, and allows the newly added party to read the history of transaction(s) and obtain the current state by having evidence of all of the previous operations on a particular channel/transaction. In other words, regardless of when a node joins a channel, every node on a particular channel can share the same state information as well as all of the previous transaction/operation history.

In addition, the State Database of Node C can continue to have stored thereon updated state information for Channel Y. However, the State Databases of Nodes A and B may continue not to comprise any or updated state information for Channel Y.

Dependent/Interdependent Channel

As described above, in some embodiments, the system can be configured to utilize one or more dependent or interdependent channels. Dependent or interdependent channels can be utilized in addition to or in lieu of independent channels. In some embodiments, a dependent or interdependent channel can refer to a channel in which a transaction thereon relies on one or more transactions or data on another channel.

Figure 5:
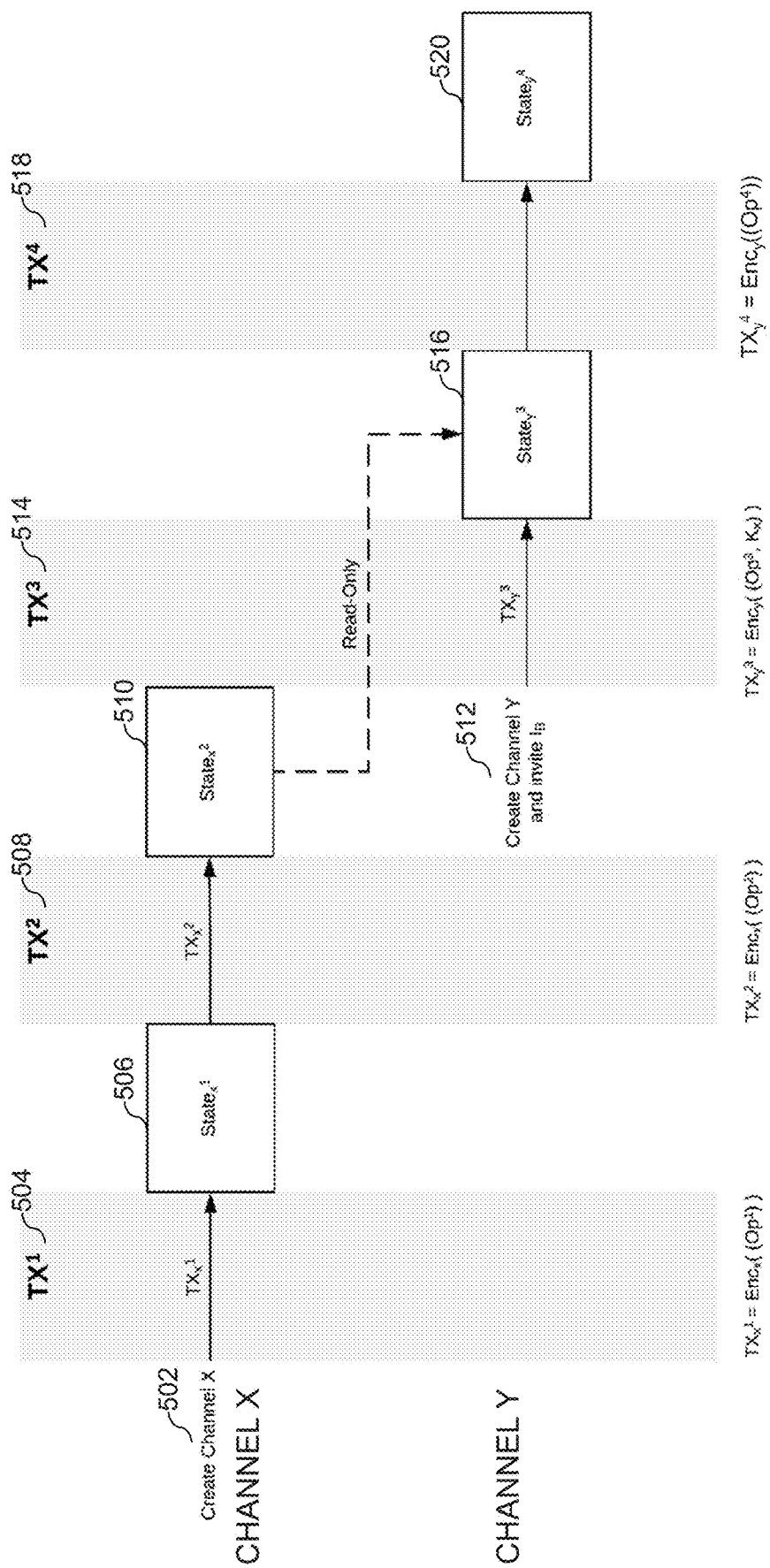
FIG. 5 is a schematic diagram illustrating an example embodiment(s) of a dependent or interdependent secure channel on a distributed ledger.

FIG. 5 is a schematic diagram illustrating an example embodiment(s) of a dependent or interdependent secure and/or private channel on a distributed ledger. In the illustrated example embodiment, the system can comprise Channel X. In particular, in some embodiments, Channel X can be created at block 502. For example, an Identity A on Node A can create a company in Channel X, information of which can be shared with member nodes on Channel X, who have access to an encryption key for Channel X ("$K_x$").

In some embodiments, a First Transaction on Channel X ("$TX_x^1$") can be generated and broadcasted on the distributed ledger at block 504. The First Transaction can comprise information relating to the creation of the company for example. In some embodiments, the First Transaction can comprise a First Operation in encrypted form, which can be denoted $Enc_x((Op^1))$. In some embodiments, member nodes on Channel X can use the Channel X encryption key "$K_x$" to decrypt the First Transaction and execute the same to obtain state information for Channel X after executing the First Transaction, which can be denoted $State_x^1$, at block 506. For example, if the First Transaction comprised information relating to the creation of the company, member nodes on Channel X, but no non-member nodes, can be aware that the company was created by decrypting and executing the First Transaction.

In some embodiments, a Second Transaction on Channel X ("$TX_x^2$") can be generated and broadcasted on the distributed ledger at block 508. For example, the Second Transaction can include company information updated by Identity A on Channel X. In some embodiments, the Second Transaction can comprise a Second Operation in encrypted form, which can be denoted $Enc_x((Op^2))$. In some embodiments, nodes on Channel X can use the Channel X encryption key "$K_x$" to decrypt the Second Transaction and execute the same to obtain state information for Channel X after the Second Transaction, which can be denoted $State_x^2$, at block 510. For example, if the Second Transaction comprised updated company information added by Identity A, member nodes on Channel X, but no non-member nodes, can be made aware of the updated company information by decrypting and executing the Second Transaction.

In some embodiments, it may be advantageous to share information on Channel X with a node or identity that was previously not a member. One way to do this may be to add the new node to Channel X as described in some embodiments herein. However, in certain situations, it may be advantageous to give access to the information on Channel X to the new node or identity without adding the new node to Channel X itself. More specifically, it may be advantageous to share information on Channel X with a new node, but not allow members of Channel X to have access to any subsequent transactions with the new node building onto information on Channel X. In addition, it may be advantageous to allow the new node to view information on Channel X but not generate new transactions on Channel X. As an illustrative example, for managing share ownership in a company, one may want shareholder workflows to be dependent on the information about the company as a whole (for example, total shares outstanding), but it may advantageous to keep such information about particular shareowners' positions private. In order to do so, in some embodiments, a new dependent or interdependent channel can be created for actions of a particular shareholder, wherein this new channel can be dependent on an existing channel for sharing information about the company, such as total shares outstanding. Another example can be a situation in which an asset or other state information on a first channel must be verified in order to process a subsequent transaction on a second channel; the second channel can be dependent on the first channel. As such, in some embodiments, the system can provide multiparty workflows as well as transfer of assets by utilizing one or more dependent and/or independent secure channels for privately sharing information on a distributed ledger network. In particular, by utilizing one or more dependent or interdependent channels, a hierarchy of knowledge can be generated and managed, wherein members of different channels can be privy to different levels of information, while all on the same distributed ledger system and maintaining data consistency across the plurality of nodes on the distributed ledger.

Referring to the example embodiment(s) illustrated in FIG. 5, a new interdependent or dependent channel, Channel Y, can be created at block 512. For example, Identity A, who is a member of Channel X, may want to propose sale of company shares to Identity B. In such circumstances, Identity B may want access to company information on Channel X prior to deciding whether to purchase Identity A's shares. However, it may not make sense to add Identity B to Channel X, because Identity B is not a shareholder and therefore should not have the ability to write or create transactions on Channel X. In addition, Identity A may not want all of the members of Channel X (e.g., other shareholders) to be aware that Identity A is proposing selling shares to Identity B. For any one or more of these or other reasons, in some embodiments, Identity A may create a dependent or interdependent channel, Channel Y, and invite Identity B ("$I_B$") to Channel Y at block 512.

In some embodiments, Identity A can generate a Third Transaction on Channel Y ("$TX_y^3$"), for example to propose sale of company shares to Identity B at block 514. Identity A and Identity B can be operating on the same node or on different nodes. In some embodiments, the Third Transaction can be encrypted with an encryption key specific to Channel Y, which is accessible only to members of Channel Y, including Identity A and Identity B. In some embodiments, the Third Transaction can comprise a set of inputs, which can include a Third Operation and the encryption key for Channel X. In other words, the Third Transaction can comprise the Third Operation and encryption key for Channel X, which can both be encrypted with an encryption key for Channel Y, which can be denoted $Enc_y((Op^3, K_x))$.

In some embodiments, Identity B can then use the encryption key for Channel Y ("$K_y$") to decrypt the Third Transaction, which comprises the Third Operation and the encryption key for Channel X. Identity B can then use the encryption key for Channel X to decrypt transactions on Channel X, which are available in encrypted form on the Distributed Log, and execute the same to determine the state information for Channel X. In addition, Identity B can execute the Third Operation after decrypting the Third Transaction using the encryption key for Channel Y. In some embodiments, the Third Operation can be dependent on or require access to the information or state information for Channel X. As such, in some embodiments, after using $K_x$ to decrypt and execute transactions on Channel X to obtain state information for Channel X and using the same to execute the Third Operation, which was obtained by decrypting the Third Transaction with $K_y$, Identity B can determine the state information for Channel Y after the Third Transaction, which can be denoted "$State_y^3$" at block 516. In some embodiments, Identity B can only have read-only access to information on Channel X by using $K_x$ to decrypt transactions on Channel X; however, Identity B may not have write access to Channel X as Identity B is not on Channel X.

In some embodiments, after executing the Third Operation in Channel Y based at least in part on information from Channel X, Identity B can then generate a Fourth Transaction on Channel Y ("$TX_y^4$") at block 518. For example, Identity B may review the company information in Channel X and accept the trade. The Fourth Transaction can be encrypted with the encryption key for Channel Y, as only Identity A and Identity B would need access to the underlying information or Operation of the Fourth Transaction. In other words, the Fourth Transaction $TX_y^4$ can be denoted as $Enc_y((Op^4))$. In some embodiments, the members of Channel Y, including Identity A and Identity B, can decrypt the Fourth Transaction using the encryption key for Channel Y and execute the Fourth Operation to obtain the resulting state information for Channel Y or "$State_y^4$."

Key Rotation/Change

In some embodiments, the system can be configured to allow an encryption key for a particular channel, whether independent or dependent, to be changed or rotated. Key rotation or change can be advantageous in a number of situations. For example, by changing or rotating the encryption key for a channel, security can be enhanced. As such, in some embodiments, the system can be configured to periodically rotate or change the encryption key for a particular channel.

In addition, by rotating or changing an encryption key to a channel, it can be possible to kick out a member node or identity from a particular channel, thereby denying access to future transactions on the channel. For example, in some embodiments, a member node or identity of a channel can rotate or change the channel encryption key and share the new channel encryption key with every member node or identity of the channel except for Node or Identity X. Then, in some embodiments, Node X or Identity X, the ex-member of that channel, will no longer be able to decryption and execute any future transactions on the channel; however, Node X or Identity X may still be able to access old transactions and state information that occurred while Node X or Identity X was a member on the channel.

In some embodiments, the systems disclosed herein can be configured to implement key rotation using a FreezeChannel transaction and/or a RotateKey transaction. In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel can be a link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This can allow the recovery of all past channel keys—when an identity receives the current channel key, it can replay and/or execute all past transactions posted in the channel by retrieving all past channel keys that are stored (in encrypted form) in the RotateKey transactions.

Example Embodiments

As described above, in some embodiments, the systems, methods, and devices described herein are configured to allow trustless sharing of private data on a blockchain or distributed ledger, and more particularly, can include frameworks and/or solutions to ensure privacy and consistency on a distributed ledger. In some embodiments, the systems, methods, and devices described herein allow selective sharing of data across a plurality of nodes on a distributed ledger or blockchain, while at the same time maintaining consistency of the data.

In some embodiments, the systems, methods, and devices described herein comprise obtaining at a first node in a plurality of nodes a first key, for example via a key exchange protocol from a second node in the plurality of nodes. In some embodiments, the systems, methods, and devices described herein comprise decrypting at the first node, at least one transaction encrypted by the first key. In some embodiments, the at least one transaction is executed in order starting from latest transaction to earliest transaction. In some embodiments, the systems, methods, and devices described herein comprise executing at the first node, the at least one transaction. In some embodiments, executing the at least one transaction includes generating a directed acyclic graph (DAG) of the at least one transaction. In some embodiments, the systems, methods, and devices described herein comprise processing at the first node, the at least one transaction based on the generated DAG and processing at least one dependent transaction of the at least one transaction. In some embodiments, the at least one dependent transaction is processed by connecting read edges and write edges of the at least one transaction based on the generated DAG. In some embodiments, the systems, methods, and devices described herein comprise storing at the first node, a local copy of the decrypted and processed DAG.

In some embodiments, the systems, devices, and methods described herein are configured to selectively eliminate sharing data with a first node in a plurality of nodes in a blockchain in order to protect the privacy of the data is provided. In some embodiments, the systems, methods, and devices comprise at a second node in the plurality of nodes: transmitting to each node in the plurality of nodes a FREEZE transaction using a first key, generating a second key, and/or generating a rotate transaction. In some embodiments, the rotate transaction includes the first key and is encrypted with the second key. In some embodiments, the systems, methods, and devices comprise transmitting the second key to each node in the plurality of nodes except the first node.

In some embodiments, a distributed ledger, such as a blockchain, can be a network of nodes operated by different, potentially hostile, owners that maintain some shared state. In certain distributed ledgers, all nodes' transactions are completely public. However, in some situations, concealing certain transactions or elements thereof, such as for privacy reasons, while simultaneously maintaining verifiable accuracy and consistent view across all the nodes can be important.

Generally speaking, as a non-limiting example, the network of nodes that form a distributed ledger, such as a blockchain, can maintain some shared state. The ledger state and/or shared state can be often generated by a sequentially consistent log of transactions, which can be processed independently and deterministically by all nodes within the network to come to an agreement on the current state of a system. In other words, transactions can be processed sequentially in an independent manner by each node within the network. Consequently, each node can determine the current state of one or more data objects in the distributed ledger. As a non-limiting example, since the transactions are deterministic, every node must arrive at the same result. For instance, consider two individual accounts, account A having $100 and account B having $100. A sequence of transactions to move $10 from account A to account B could include a first transaction verifying if account A has enough money and debiting $10 and then a second transaction crediting $10 into account B. Each of these transactions can be processed independently and deterministically by all nodes within the network. In this example, current shared ledger state could represent account A with $90 and account B with $110.

However, in order to prevent the "double-spend" problem and to enable consistency across all nodes, every transaction can be made public across all the nodes in implementations of a blockchain such as Bitcoin for example. To give an illustrative example, when node A sends an asset to node B, every node on the network can see that node A's account has been debited. If these transactions were concealed, node A could send the same asset to node C because only node A and node B would be aware of the previous transaction. In other words, every cash transfer, credit card charge, and healthcare transaction may have to be made available to every node on the network in order to facilitate verifiable accurate and consistent view of the distributed ledger. Hence, such implementations of distributed ledgers and blockchains may not be applicable to many real-world technologies without resolving the contradiction of individual privacy and a consistent, synchronized view of the current ledger state.

In view of the above, in some embodiments, the systems, devices, and methods described herein provide frameworks and solutions to ensure both privacy and consistency on a distributed ledger. In some embodiments, the state changes of data objects in the distributed ledger can be tracked in a dependency graph. Then, in some embodiments, when data is shared amongst the nodes in the distributed ledger, the data that is shared across a subset of nodes in a network can be selectively disclosed. In some instances, the data that is shared across the subset of nodes can include additional verifiable information to allow for validation of the data across the subset of nodes. In this manner, in some embodiments, a group of nodes involved in a sequence of transactions can have a consistent view of a subset of the global state, and this subset can remain private from other nodes in the network.

Transactions and Data Dependencies

In some embodiments, transactions can be arranged in a dependency graph, where the edges represent the inputs and outputs of a transaction's function. In particular, in some embodiments, each transaction can include (1) a set of input states, (2) a function that computes over the input states, and (3) a special input for data verification. As an illustrative example, consider a transaction in a distributed ledger to credit $10 into account A. The set of input states for this transaction can represent the balance in account A at the time the transaction is executed. The function that computes over the input states can be a function to credit $10 into account A. In another example, consider a scenario in which a doctor requests a scan for a patient. An insurance company can post a transaction on a distributed ledger with a set of input states that represent the doctor's request and the patient's insurance record and the function that computes over the input states can be a function to approve the doctor's request.

In some embodiments, a special input, called the "proof," can provide a mechanism for a node to independently verify that the input states are valid. In some embodiments, whether the states represent integers or arbitrary collections of data, different types of proofs can be used to validate the states. Some non-limiting examples of concrete instantiations of such proof mechanisms include partially homomorphic encryption, zero knowledge proofs, verifiable computation, re-running all past transactions locally, which can require cryptographic keys that are used to protect past transactions, and/or the like. The end result of "proof" can be that the subset of the nodes in the network that include the transaction including the "proof" will agree on the latest value within a state of a data object within the distributed ledger and/or the ledger state.

As discussed above, in some embodiments, the transactions can be arranged in a dependency graph. By sharing this graph amongst a group of nodes within the distributed ledger, each node can independently execute the transactions to verify that the outputs are correct and consistent amongst all the nodes within that group.

Example Graph Structure

In some embodiments, the execution of a sequential log of transactions can generate a directed acyclic graph (DAG) with labeled edges. As referred to herein, in some embodiments, the graph G=(V, E) is a set V of vertices and a set E of labeled edges. In some embodiments, a transaction creates a new vertex in the graph. Each vertex can represent the state of a data item at a point in the transaction history. The structure of the data can be arbitrary, and the vertex may represent the state of a single integer or a complex data structure (e.g. to represent a corporate bond, healthcare record, car title). All edges can be labeled either Read or Write, L={W, R}. A Read edge (x, y, R) can imply that vertex y can read from vertex x. A Write edge (x, y, W) can imply that 1) vertex y can read from vertex x and 2) vertex y is a new version of vertex x. In other words, the Write edge can update the data contained within vertex x.

In some embodiments, when a transaction is posted on the distributed ledger, each node with access to the transaction (e.g., each node with which the transaction is shared) generates a vertex. As discussed above, in some embodiments, every node processes the transaction individually and independently. In some embodiments, each node can execute the transaction at different times. In some embodiments, when a node executes the transaction, Read and Write edges can be created for the transaction. In this manner, in some embodiments, by executing a sequential log of transactions each node can generates a DAG.

In some embodiments, every vertex can have exactly 0 or 1 Write edges, and 0 or more Read edges. In some embodiments, the path of the Write edges can represent the evolution of the state of a data object. For example, the path of Write edges can represent the evolution of a corporate bond, health record, car title, and/or the like. In some embodiments, the write path can be represented as:

$$\forall v \in V, p = \{v_1, v_2, \ldots, v_n\} \text{ where } \{(v_1, v_2, W), (v_2, v_3, W), \ldots, (v_{n-1}, v_n, W)\} \subseteq E$$

In some embodiments, the last vertex vn in this path holds the current state of a data item, denoted curr(p). This vertex can have an outdegree of 0 Write edges, though there may, in some instances, be many outgoing Read edges. In some embodiments, all or some of the write paths are disjoint sets, forming a linear forest. In some embodiments, since there is a unique write path for every state or data object, the set of all write paths p can be denoted P, where $\forall p_i, p_j \in P, p_i \cap p_j = 0$.

As an illustrative example, consider a distributed ledger for corporate bonds. The evolution of each corporate bond can be represented by at least one unique write path. The history of a corporate bond can be tracked by tracing the vertexes in the write path for that bond. That is, each vertex in the write path for a corporate bond can represent a state of the corporate bond. The last vertex in the write path for the corporate bond can represent the current state of the corporate bond.

In some embodiments, a transaction inserts a new vertex in the graph. In some embodiments, a special type of transaction (e.g., "new" transaction) can create a new vertex with no edges. It can initialize an empty state and create a write path of one vertex. As an illustrative example, consider adding a new account, say account C, to an existing distributed ledger. The addition of new account C can be a special type of transaction that creates a vertex for account C with an empty state. The changes to the balance of account C (i.e., crediting and/or debiting account C) can create a write path.

In some embodiments, a regular transaction T names a path $p^w$ to create exactly one Write edge, and a set of 0 or more paths $p^r$ to create Read edges. It can also contain a function F that can read from the curr(p) vertex from all the listed paths (i.e., all listed write paths and read paths), and produces a new vertex to append to $p^w$.

$$T = (p^w, \{p_i^r\}, F(\text{curr}(p^w), \text{curr}(\{p_i^r\})))$$

In some embodiments, when the transaction executes, it can update the graph with a new vertex v and a set of edges:

$$G' = (V \cup \{v\}, E \cup \{(w, v, W), (ri, v, R)\}) \text{ where } w, ri \in V$$

Figure 6:
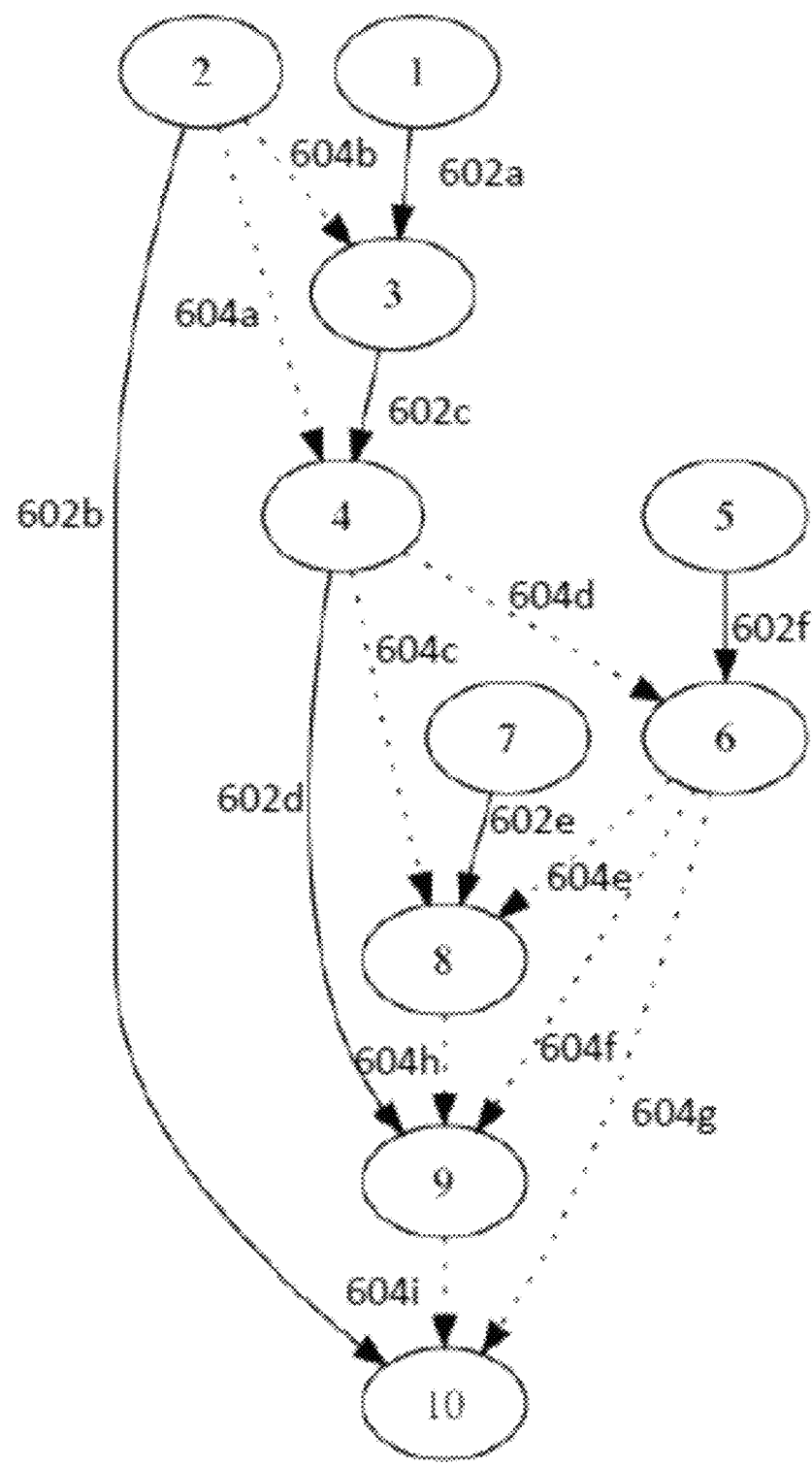
FIG. 6 is a schematic diagram illustrating an example transaction graph with write and read edges.

FIG. 6 illustrates a sample transaction graph with Write and Read edges. In the illustrated example of FIG. 6, the solid lines (e.g., 602a-602f) represent Write edges (collectively, Write edge 602), the dotted lines (e.g., 604a-604i) are Read edges (collectively, Read edge 604). In the illustrated example of FIG. 6, the transactions are numbered in the order they are processed. In some embodiments, the DAG is constructed one vertex at a time. For example, transaction 8 updates 7 and reads from 4 and 6 to create vertex 8, at which point the graph consists of vertices {1 . . . 8}. After transaction 10 completes, the write paths are {2, 10}, {1,3,4,9}, {7,8} and {5,6}. The latest value of any vertex can be determined by looking at the data within the last vertex in each path. In this instance, the set of last vertexes in each write path after transaction 10 completes are {10, 9, 8, 6}. Any new transaction can only read and write from vertices in this set. In fact, one can examine the value of a vertex at any point in time. For example, after transaction 5 inserts vertex 5, the ledger state can be found in {5, 4, 2}. In other words, after transaction 5 inserts vertex 5, the write paths are {2}, 11,3,41, and {5} and the last vertex in each of the write paths hold the current state of the system, in this instance, {5, 4, 2}. In the illustrated example, the graph maintains the full history of all state changes in the system. It is a persistent data structure that captures every state change at every point in time.

Figure 7:
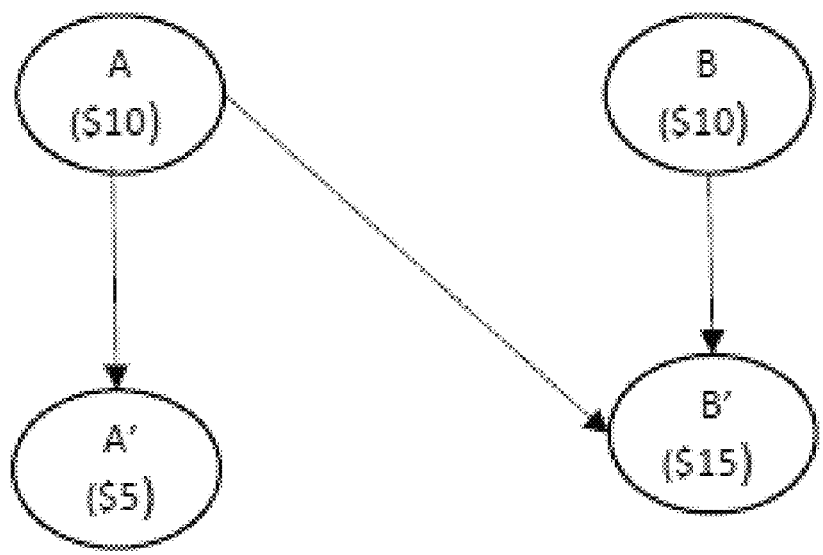
FIG. 7 is a schematic diagram illustrating an example exchange between two nodes using an example directed acyclic graph.

FIG. 7 illustrates an example exchange between two nodes, in particular an exchange of money between two nodes A and B, using an example directed acyclic graph. For purposes of illustration, assume that a graph is initialized with two vertices A and B, each with $10 as the state. In some embodiments, moving $5 from A to B can require two transactions. In particular, transaction #1 can read from A to verify it has enough money, then update B to create B' with $15. In other words, transaction #1 can insert vertex B' in the graph. The execution of transaction #1 inserts a Read edge from A to B' and a Write edge from B to B'. Transaction #2 can update A to A' with $5 (i.e., a new vertex A' is inserted with a Write edge from A to A'). In some embodiments, these transactions must be run together atomically to ensure no node ever sees a state where A has $10 and B' has $15. In some embodiments, all transactions after this will only see the vertices A' and B' containing the updated account balances as their state.

Example Embodiments—Sharing of Private Data

In some embodiments, a network can include a subset of independent nodes that wish to hide data from all other nodes (not within the subset) within the network. The subset of independent nodes can be configured to share the data with only member nodes within the subset. For example, four nodes can collaborate on a deal and be configured to hide the details from all other nodes in the network. Transactions can be selectively shared among the four nodes in various ways: sent directly to only the group members, pulled on demand from group members, and/or encrypted and broadcast on a decentralized ledger.

In some embodiments, the first technique for sharing transactions is to only share it with members of a group. The transactions can be annotated with metadata that lists which nodes are allowed to receive it. The second technique can be to only send a hash of the transaction plus some metadata to all nodes. Each node can decide whether to request the data from the node which initiated the transaction. This node can decide whether to send the data or not. Finally, in some embodiments, the data can be encrypted and sent to all members, which is described in more detail below.

Example Embodiments—Selective Sharing with Encryption

In some embodiments, every write path is encrypted by a different symmetric key or is unencrypted (a null key). A write path encrypted with a null key can be accessed, processed, and decrypted by every node within the network. In some embodiments, the symmetric key and/or unencrypted key can be generated when a node issues a special type of transaction to create a new vertex with no edges. In some embodiments, every transaction can be encrypted by the same symmetric key used for the write state within the transaction. In some embodiments, to nodes without the correct keys, all the transactions broadcast in the network are encrypted and unreadable. Therefore, in some embodiments, each node sees a subgraph containing only those vertices and edges for which they have the appropriate symmetric encryption keys. In some embodiments, the union of all these subgraphs can be the complete graph representing the global state of the network.

Figure 8:
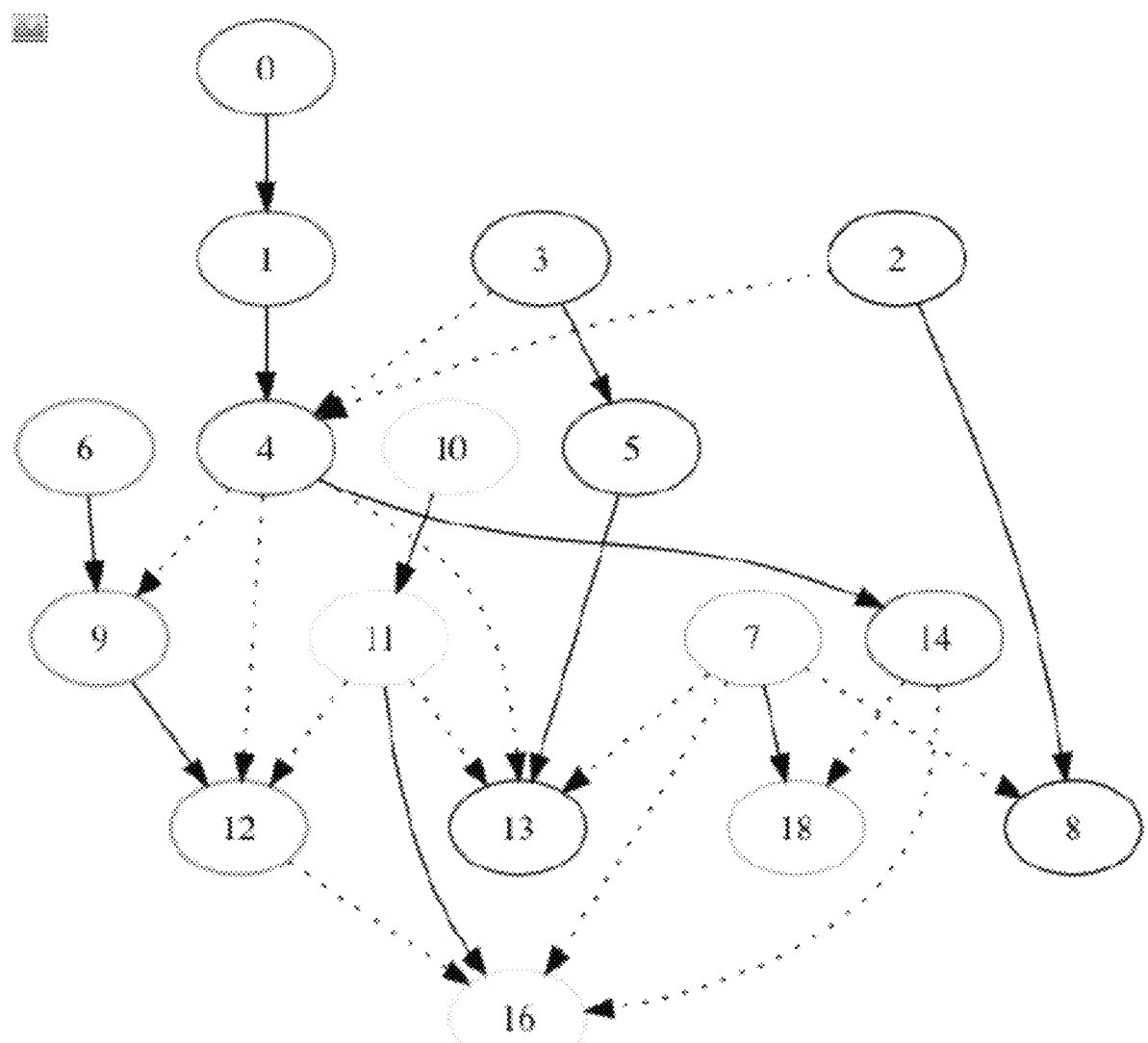
FIG. 8 is a schematic diagram illustrating an example graph implementing selective sharing with encryption and channel dependency.

FIG. 8 illustrates an example graph implementing selective sharing with encryption and channel dependency. In the illustrated example, the numbers in the vertices correspond to the transaction executed to create the vertex. In some embodiments, every write path is encrypted by a different key. The write paths in the example graph are {0, 1, 4, 14}, {2, 8}, {3, 5, 13}, {6, 9, 12}, {7, 18}, and {10, 11, 16} and are denoted by different colors.

For example, transaction 13 creates a new vertex 13 in the example illustrated in FIG. 8. The transaction itself can be encrypted by the symmetric key assigned to the blue write path {3, 5}, denoted as key(p). In some embodiments, nodes without the key would never see the blue write path {3, 5, 13} in the graph. In some embodiments, only those nodes with the correct key can decrypt and process transaction 13, which implies these nodes already see the blue write path {3, 5, 13}. However, in the illustrated example, to read the vertices {11, 4, 7} also requires having the keys for the red {0, 1, 4, 14}, yellow {10, 11, 16} and orange {7, 18} paths. In the illustrated example, the keys for all Read edges are included in the transaction; therefore, a node is only required to have the blue key to decrypt transaction 13. For instance, the key for the red {0, 1, 4}, yellow {10, 11}, and orange {7} paths are included in transaction 13.

In some embodiments, transactions do not include vertices to read from. Instead, in some embodiments, transactions can include keys to the write path. In some embodiments, when a transaction is submitted by a client, it does not get a transaction number until the network includes it in the distributed ledger or blockchain. As an illustrative example, assume two clients submit transactions that depend on transaction 1. In some embodiments, the network will put them in an arbitrary sequential order and assign them transaction numbers. Assume one of these transactions is 4. In some embodiments, this will modify the state of vertex 1 into vertex 4. Assume the next transaction is 14. In some embodiments, it can no longer modify vertex 1 because it has been overwritten by vertex 4. In some embodiments, by referring to write paths indirectly with keys, a transaction is not strictly dependent on a specific transaction, which could change at any time. Instead, in some embodiments, a transaction will append a vertex on top of the current tip of a write path. That is, by including the key to the write paths in the transactions, the transactions can read from the current state of the data object that is represented by the write path.

In contrast, providing a vertex in the transaction to read from can necessitate additional computational steps. In particular, in some embodiments, since the nodes execute transactions independently and at different times, the state of the data object may change over time. In some embodiments, by including just the vertices, nodes may have to execute the transaction (which may result in an error due to state change), update the state of the data object, and execute the transaction a second time with the updated state.

In some embodiments, a transaction encrypted by the key for the Write edge can be now defined as follows:

$$T=(key(p^w),\{key(p^w)\},F(curr(p^w),curr(\{p_i^r\})))$$

In some embodiments, if this is the first time a node has ever seen a particular path, it must decrypt and process all transactions encrypted by that key to reconstruct the path in the graph. For example, in some embodiments, if a node has never seen the red path {0, 1, 4, 14}, it must decrypt and process transactions 0, 1, and 4 to have the current state of the red path (e.g., when the node is processing transaction 13). In some embodiments, only then can it process transaction 13, which depends on 4. This can be important because, in some embodiments, there could be no other safe way to get the data from 4. In some instances, a node cannot ask another node for the data, because it may "lie" and provide incorrect data. In some embodiments, a node must execute all the transactions itself to generate the correct states, thereby verifying that the node's final view is correct, and unable to be manipulated.

In some embodiments, there can be two ways for a node to get the symmetric keys for a path. The first, explained above, can be when keys are provided as part of the Read set for a transaction. In some embodiments, to share a subgraph with a node, the symmetric key for the Write path must be delivered directly to a node to add it to the group. In some embodiments, nodes can use a key exchange protocol to securely share the symmetric keys. In some embodiments, when a node receives a symmetric key for a write path, it retrieves all previous transactions forming this write path, plus all dependent Read paths, and executes these transactions in the order they were published to reconstruct the subgraph representing this private state. For instance, in some embodiments, when a node receives a symmetric key for the green write path {6, 9, 12}, the node can retrieve all the transactions in this write path, plus the dependent read paths {0, 1, 4} and {10, 11}. In some embodiments, it executes these transactions in the order they were published. In some embodiments, the node does not require transactions 14 and 16, even though they are on the red and yellow write paths. In some embodiments, since these transactions occurred after transaction 12, they do not affect the green write path.

In some embodiments, to remove a node from a group, a group must generate a new key to encrypt future transactions in the write path so that the removed node has no access to any subsequent transactions.

In some embodiments, without privacy every node processes every transaction to construct identical DAGs representing the history of all state calculations. With privacy, in some embodiments, every node constructs an induced subgraph of the DAG, limited to only the write paths for which they have the right keys. In some embodiments, a node can share a subgraph with another node by sending the symmetric key. In some embodiments, the recipient node can decrypt transactions with that key and reconstruct the subgraph. In some embodiments, all nodes with the same keys will see the same subgraph.

In some embodiments, sharing the symmetric keys for read and write edges allows a group of nodes to process transactions, while hiding the states from other nodes not in the group. However, in some embodiments, this works if the membership of the group remains constant starting from the first vertex in the write path. In such embodiments, if a group's membership changes, special care must be taken to ensure the privacy of the data.

Removing a node from a group can illustrate some of the machinery required to handle membership changes. For example, in some embodiments, if a node is removed from a group sharing a common symmetric key for a write path, a new key can be generated for the remaining members of the group. Hence, the write path may no longer encrypted by a single key. Instead, in some embodiments, the write path is partitioned into segments, each encrypted by a different key. For example, it can now be a path $p=\{s_1, s_2, \ldots, s_n\}$, where each segment $s_i$ is a write path encrypted by a different symmetric key. In some embodiments, when a new segment is created, the new symmetric key is sent to members of the group using a key exchange protocol or other methods described herein.

In some embodiments, in order to implement this on a distributed ledger or blockchain, a pair of additional special messages may be needed to handle the symmetric keys. First, in some embodiments, a FREEZE message is sent to all members of the group. In some embodiments, this message can indicate the end of a path segment and can be encrypted by the current symmetric key. In some embodiments, any transaction encrypted by the same key that arrives after the FREEZE message can be ignored. The second special message, in some embodiments, is a ROTATE message, which indicates the beginning of a path segment. In some embodiments, this message contains the symmetric key for the previous path segment and it can be encrypted by a new symmetric key for the next path segment. In some embodiments, given only the symmetric key for the latest path segment, a node can decrypt the previous path segment by using the symmetric key concealed in the ROTATE message. In some embodiments, the combination of these two transactions demarcate the beginning and end of path segments, and allows a node to decrypt all path segments.

In some embodiments, to remove a node, additional messages can be sent out to the network. For example, in some embodiments, a FREEZE message can be sent using the current key to declare the end of a segment. In some embodiments, a new symmetric key can be generated. In some embodiments, a ROTATE message containing the current key can encrypted with the new key. Further, in some embodiments, a node can be removed from the group, and the new key can be sent to the remaining nodes in the group.

In some embodiments, at this point the key rotation is complete and the removed node can no longer decrypt transactions sent to the group. In some embodiments, once a FREEZE message is processed, the node(s) no longer decrypts transactions with the current key. In some embodiments, any transactions using that key already sent on the network will be ignored.

In some embodiments, when a node is added to a group for a write path, the latest symmetric key is sent to the new node by a key exchange protocol or other methods described herein. However, in some instances, hundreds or thousands of transactions may have already been processed before this node was added to the group. In some embodiments, all these encrypted transactions exist on every node's local copy of the log. In some embodiments, for the new node to have a consistent view of these transactions, the new node decrypts and executes all these transactions, including dependent transactions connected by read and write edges. In some embodiments, the entire decrypted subgraph is a tree rooted at the next transaction encrypted by this same symmetric key.

In some embodiments, the decryption scheme takes into consideration the possibility that the write path may be divided into many segments. In some embodiments, the new node may need to decrypt all the segments. In some embodiments, since the new node has the latest key, it decrypts the last segment in the write path. In some embodiments, the first message in that last segment will be a ROTATE message. In some embodiments, this can contain the symmetric key for the previous segment. In some embodiments, the node will recursively decrypt each previous segment until it decrypts the entire write path. In some embodiments, by executing all the transactions in the write path, the new node will reconstruct the subgraph representing the state. At this point, in some embodiments, the new node will have the same subgraph as all other members in the group and can now safely participate in the group.

Figure 9:
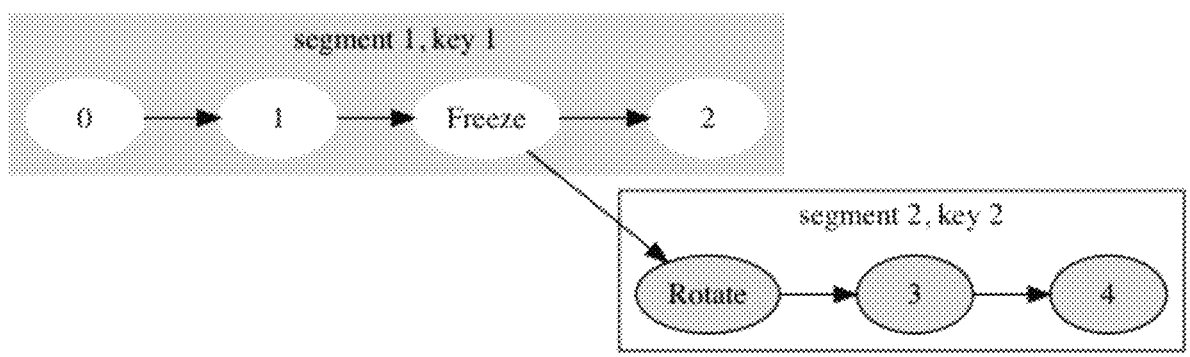
FIG. 9 is a schematic diagram illustrating an example single write path with two segments having two different keys.

FIG. 9 illustrates an example single write path with two segments having two different keys. In the illustrated example, in segment 1, all transactions are encrypted by key 1. In some embodiments, when a node processes the FREEZE message, it ignores any remaining transactions encrypted by the same key. Therefore, in the illustrated example, transaction 2 may not get executed. In some embodiment, after the FREEZE message, key 2 is generated and sent to all members of the group. Then, in some embodiments, the ROTATE key message is published, which contains key 1. In some embodiments, since all nodes will get key 2, they can decrypt and process transactions 3 and 4.

In some embodiments, when a node is added to a group, it is sent the latest key for the write path. In the example illustrated in FIG. 9, a new node can be sent key 2. This node can look at all past transactions to decrypt segment 2. When it decrypts the Rotate message, it can discover key 1. It can use this to decrypt segment 1. Once all the segments in the write path are decrypted, they can be executed in order. In some embodiments, the completion of this process ensures the node has constructed the same subgraph as all other nodes in the group.

In some embodiments, as discussed above, transactions can include a special input called "proof" to independently verify if input states are valid. In some embodiments, special input of a transaction can be the symmetric key. In such instances, the "proof" can include decrypting the subgraph encrypted by the symmetric key.

Example Implementation

In some embodiments, the systems, methods, and devices described herein can be stored as a program component that is executed by a CPU at every node within the distributed ledger. In some embodiments, some features discussed herein enable displaying data selectively across the nodes within the distributed ledger. In some embodiments, some features discussed herein also ensure consistency of data across the nodes within the distributed ledger. Consequently, in some embodiments, verifiably accurate data can be provided across the nodes while also maintaining privacy as required.

In some embodiments, the generating of DAGs of transactions can be developed by employing development tools and languages such as, but not limited to: Apache components, Assembly, ActiveX, binary executables, (ANSI) (Objective-) C (++), C# and/or .NET, database adapters, CGI scripts, Golang, Java, JavaScript, mapping tools, procedural and object oriented development tools, Pascal, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); Representational State Transfer (REST); SWFObject; Yahoo! User Interface; and/or the like), WebObjects, and/or the like. In some embodiments, some features and technologies disclosed herein implement key exchange protocols such as Diffie-Hellman key exchange or RSA key transport to securely exchange keys to segments of write path between nodes in the distributed ledger.

An example pseudocode implemented by a processor (and/or processors) within a node on a distributed ledger or blockchain to generate DAGs, decrypt transactions, and/or exchange keys, according to some embodiments, is provided below:

```
from functools import singledispatch
from collections import namedtuple, defaultdict
from networkx import DiGraph
from pyrsistent import m
State=namedtuple('State', ['name', 'key'])
Transaction=namedtuple('Transaction', ['write_state', 'read_states', 'func'])
NewChannel=namedtuple('NewChannel', ['write_state'])
Freeze Channel=namedtuple('FreezeChannel', ['write_state'])
RotateState=namedtuple('RotateState', ['write_state', 'prev_key'])
SendKey=namedtuple('Sendkey', ['write_state'])
Encrypt=namedtuple('Encrypt', ['key', 'data'])
class Node:
def_init_(self, pub_key="MYKEY"):
self.PublicKey=pub_key
self.KEYS=['null']
self.PendingTX={ }
self.StateGraph=DiGraph( )
self.StateGraph.add_node(-1, state=m( )) # public state
self.WritePaths=defaultdict(list, public=[-1]) #type: Dict [str,
   List[Tuple[int,pMap]]]
def catchup(n, curr_txi, name, key):
if not key in n.KEYS:
n.KEYS.append(key)
if key in n.PendingTX:
for packet, ptxi in n.PendingTX[key]:
execute(packet.data, n, ptxi)
del n.PendingTX[key]
else:
pass # no tx yet
if n.WritePaths[name]:
txi=next(i for i in n.WritePaths[name] if i<curr_txi)
return txi
# Messages
@ singledispatch
def execute(command, node, tx_index):
assert False, "Invalid command type:"+str(type(command))
@ execute.register(Transaction)
def_(c, n, txi):
name, key=c.write_state
write_txi=catchup(n, txi, *c.write_state)
read_txis=[catchup(n, txi, *state) for state in c.read_states]
write_map=n.StateGraph.nodes[write_txi]["state"]
read_maps=[n.StateGraph.nodes[r]["state"] for r in read_txis]
new_map=c.func(write_map, *read_maps)
n.StateGraph.add_node(txi, action="transaction", state=new_map)
n.StateGraph.add_edge(txi, write_txi, label="write")
n.StateGraph.add_edges_from(((txi, r) for r in read_txis), label="read")
n.WritePaths[name].insert(0, txi)
@ execute.register(NewChannel)
def_(c, n, txi):
name, key=c.write_state
n.StateGraph.add_node(txi, state=m( ))
n.WritePaths[name].insert(0, txi)
@ execute.register(FreezeChannel)
def_(c, n, txi):
name, key=c.write_state
prev=catchup(n, txi, name, key)
n.StateGraph.add_node(txi, action="freeze", state=n.StateGraph.nodes[prev]['state'])
n.StateGraph.add_edge(txi, prev, label="write")
n.WritePaths[name].insert(0, txi)
@ execute.register(RotateState)
def_(c, n, txi):
name, key=c.write_state
prev=catchup(n, txi, name, c.prev_key)
n.StateGraph.add_node(txi, action="rotate", state=n.StateGraph.nodes[prev]['state'])
n.StateGraph.add_edge(txi, prev, label="write")
n.WritePaths[name].insert(0, txi)
@ execute.register(SendKey)
def_(c, n, txi):
name, key=c.write_state
catchup(n, txi, name, key)
def dispatch(node, packet, txi):
k=packet.key
if k in node.KEYS:
execute(packet.data, node, txi)
elif k==node.PublicKey:
execute(packet.data, node, txi)
else:
node.PendingTX[k]=node.PendingTX.get(k, [  ])+ [(packet, txi)]
```

As such, in some embodiments, the systems, devices, and methods described herein allow trustless sharing of private data on a blockchain. In some embodiments, transactions can be selectively shared with some nodes in the blockchain and hidden from other nodes in the blockchain to protect privacy of the data. In some embodiments, transactions in the blockchain are arranged in a dependency graph with labeled edges. In some embodiments, a graph with read paths and write paths is generated as the transactions are executed. In some embodiments, each write path can be encrypted with a key thereby selectively hiding data from nodes that do not possess the key. In some embodiments, each node sees a subgraph containing only those vertices and edges for which they have the appropriate encryption keys. In some embodiments, subgraphs can be decrypted by using the appropriate encryption keys. In some embodiments, the union of all these subgraphs is the complete graph representing the global state of the blockchain.

In some embodiments, a computer-implemented method to selectively share data across a plurality of nodes in a blockchain by maintaining consistency of the data comprises: at a first node in the plurality of nodes: obtaining a first key via a key exchange protocol from a second node in the plurality of nodes; decrypting at least one transaction encrypted by the first key, the at least one transaction being executed in order starting from latest transaction to earliest transaction; executing the at least one transaction, the execution including generating a directed acyclic graph (DAG) of the at least one transaction; processing the at least one transaction based on the generated DAG; processing at least one dependent transaction of the at least one transaction by connecting read edges and write edges of the at least one transaction based on the generated DAG; and storing a local copy of the decrypted and processed DAG.

In some embodiments, a computer-implemented method to selectively eliminate sharing data with a first node in plurality of nodes in a blockchain to protect the privacy of the data comprises: at a second node in the plurality of nodes: transmitting to each node in the plurality of nodes a FREEZE transaction using a first key; generating a second key; generating a rotate transaction, the rotate transaction including the first key and encrypted with the second key; and transmitting the second key to each node in the plurality of nodes except the first node.

Computer System

Figure 10:
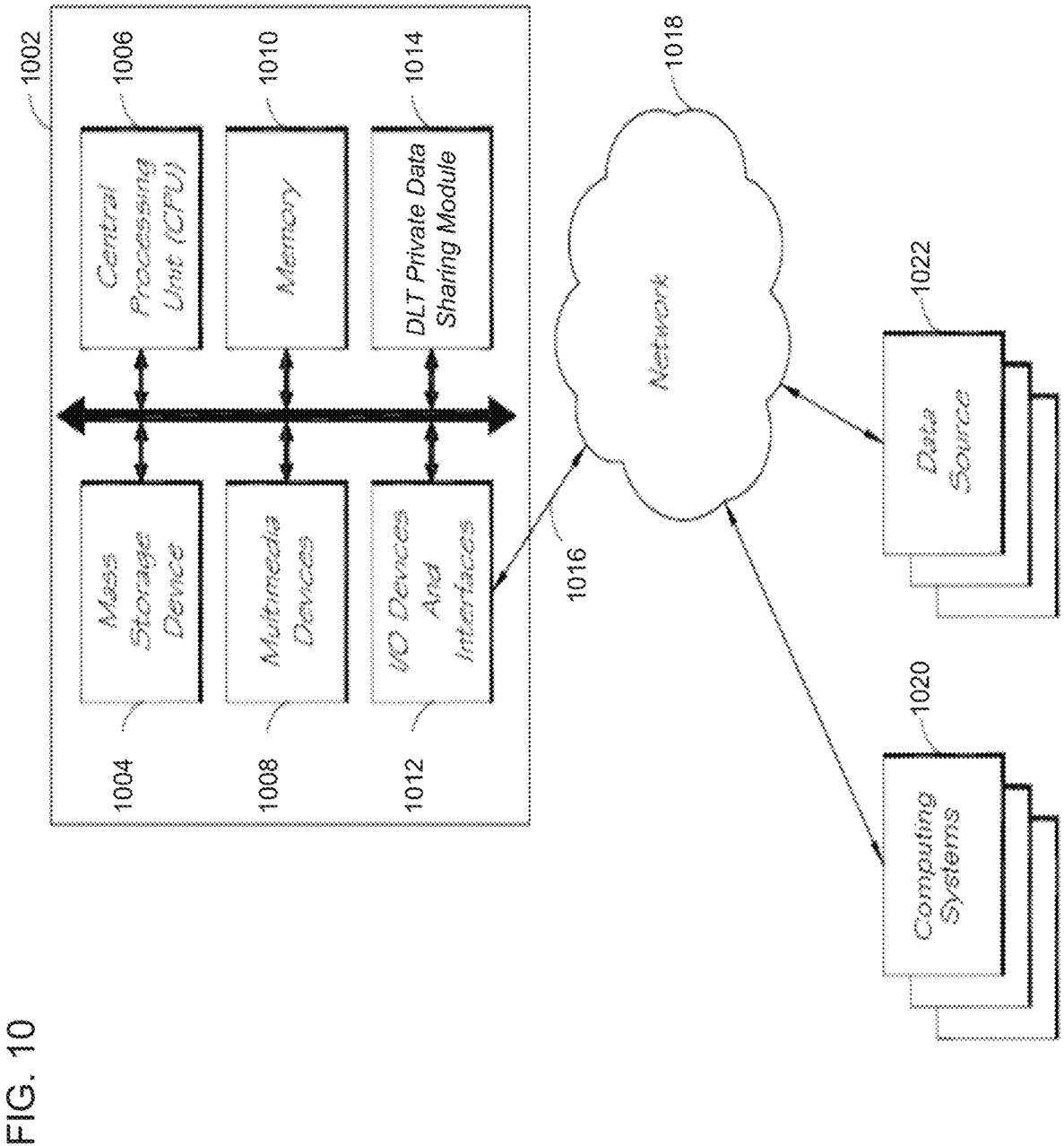
FIG. 10 is a schematic diagram depicting an embodiment(s) of a computer hardware system configured to run software for implementing one or more embodiments of systems, devices, and methods for encrypted electronic storage and confidential network transfer of private data through a trustless distributed ledger technology system.

In some embodiments, the systems, processes, and methods described herein are implemented using one or more computing systems, such as the one illustrated in FIG. 10. The example computer system 1002 is in communication with one or more computing systems 1020 and/or one or more data sources 1022 via one or more networks 1018. While FIG. 10 illustrates an embodiment of a computing system 1002, it is recognized that the functionality provided for in the components and modules of computer system 1002 may be combined into fewer components and modules, or further separated into additional components and modules.

The computer system 1002 can comprise a DLT Private Data Sharing module 1014 that carries out the functions, methods, acts, and/or processes described herein. The DLT Private Data Sharing module 1014 is executed on the computer system 1002 by a central processing unit 1006 discussed further below.

In general the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1002 includes one or more processing units (CPU) 1006, which may comprise a microprocessor. The computer system 1002 further includes a physical memory 1010, such as random access memory (RAM) for temporary storage of information, a read only memory (ROM) for permanent storage of information, and a mass storage device 1004, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1002 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1002 includes one or more input/output (I/O) devices and interfaces 1012, such as a keyboard, mouse, touch pad, and printer. The I/O devices and interfaces 1012 can include one or more display devices, such as a monitor, that allows the visual presentation of data to a participant. More particularly, a display device provides for the presentation of GUIs as application software data, and multi-media presentations, for example. The I/O devices and interfaces 1012 can also provide a communications interface to various external devices. The computer system 1002 may comprise one or more multi-media devices 1008, such as speakers, video cards, graphics accelerators, and microphones, for example.

The computer system 1002 may run on a variety of computing devices, such as a server, a Windows server, a Structure Query Language server, a Unix Server, a personal computer, a laptop computer, and so forth. In other embodiments, the computer system 1002 may run on a cluster computer system, a mainframe computer system and/or other computing system suitable for controlling and/or communicating with large databases, performing high volume transaction processing, and generating reports from large databases. The computing system 1002 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 1002 illustrated in FIG. 10 is coupled to a network 1018, such as a LAN, WAN, or the Internet via a communication link 1016 (wired, wireless, or a combination thereof). Network 1018 communicates with various computing devices and/or other electronic devices. Network 1018 is communicating with one or more computing systems 1020 and one or more data sources 1022. The DLT Private Data Sharing module 1014 may access or may be accessed by computing systems 1020 and/or data sources 1022 through a web-enabled user access point. Connections may be a direct physical connection, a virtual connection, and other connection type. The web-enabled user access point may comprise a browser module that uses text, graphics, audio, video, and other media to present data and to allow interaction with data via the network 1018.

Access to the DLT Private Data Sharing module 1014 of the computer system 1002 by computing systems 1020 and/or by data sources 1022 may be through a web-enabled user access point such as the computing systems' 1020 or data source's 1022 personal computer, cellular phone, smartphone, laptop, tablet computer, e-reader device, audio player, or other device capable of connecting to the network 1018. Such a device may have a browser module that is implemented as a module that uses text, graphics, audio, video, and other media to present data and to allow interaction with data via the network 1018.

The output module may be implemented as a combination of an all-points addressable display such as a cathode ray tube (CRT), a liquid crystal display (LCD), a plasma display, or other types and/or combinations of displays. The output module may be implemented to communicate with input devices 1012 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1002 may comprise a physical or logical connection established between a remote microprocessor and a mainframe host computer for the express purpose of uploading, downloading, or viewing interactive data and databases on-line in real time. The remote microprocessor may be operated by an entity operating the computer system 1002, including the client server systems or the main server system, and/or may be operated by one or more of the data sources 1022 and/or one or more of the computing systems 1020. In some embodiments, terminal emulation software may be used on the microprocessor for participating in the micro-mainframe link.

In some embodiments, computing systems 1020 who are internal to an entity operating the computer system 1002 may access the DLT Private Data Sharing module 1014 internally as an application or process run by the CPU 1006.

The computing system 1002 may include one or more internal and/or external data sources (for example, data sources 1022). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1002 may also access one or more databases 1022. The databases 1022 may be stored in a database or data repository. The computer system 1002 may access the one or more databases 1022 through a network 1018 or may directly access the database or data repository through I/O devices and interfaces 1012. The data repository storing the one or more databases 1022 may reside within the computer system 1002.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Embodiments

Although this invention has been disclosed in the context of some embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that some embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A trustless decentralized network system for selectively sharing data while maintaining consistency of the data, the system comprising:
  a plurality of nodes each comprising a computer processor and an electronic storage medium, wherein each node of the plurality of nodes operates a platform on the respective node, wherein each node of the plurality of nodes of the platform comprises:
    a distributed log for recording encrypted transactions, wherein the encrypted transactions in each of the distributed logs among the plurality of nodes are consistent; and
    a state database for storing state information based on the recorded encrypted transactions in the distributed log, and
  wherein the platform enables each node of the plurality of nodes to privately communicate a transaction via a private channel the respective node is a member of by:
    receiving, at a first node of the trustless decentralized network system, a transaction for sharing through the private channel on the trustless decentralized networked system;
    accessing, by the first node, an encryption key associated with the private channel, wherein one or more nodes of the plurality of nodes are members of the private channel, wherein each of the one or more nodes possesses the encryption key, and wherein the encryption key enables the one or more nodes to decrypt the encrypted transaction, execute the transaction, and store results of the executed transaction in its respective state database;
    encrypting the transaction based on the encryption key associated with the private channel, wherein member nodes of the private channel are in possession of the encryption key; and
    transmitting the encrypted transaction to all other nodes of the plurality of nodes to record in their respective distributed logs, wherein the encryption key enables the member nodes of the private channel to: decrypt the encrypted transaction, execute the decrypted transaction, and store results of the executed decrypted transaction in its respective state database.

2. The system of claim 1, wherein the platform enables each node of the plurality of nodes to publicly communicate the transaction by:
  transmitting the transaction to all other nodes of the plurality of nodes to record in their respective distributed logs.

3. The system of claim 1, wherein the private channel is established by distributing the encryption key to the member nodes of the private channel.

4. The system of claim 1, wherein the platform further enables one or more unique identities to be associated with each node of the plurality of nodes.

5. The system of claim 1, wherein the platform further comprises a secret database for storing encryption keys associated with private channels.

6. The system of claim 1, wherein the encryption key is a symmetric key.

7. The system of claim 1, wherein the encryption key is an asymmetric key.

8. The system of claim 1, wherein the encryption key comprises a pair of encryption and decryption keys.

9. A computer-implemented method comprising:
  providing a platform for operation on each node of a plurality of nodes of a trustless decentralized network system, wherein each node of the plurality of nodes comprises a computer processor and an electronic storage medium, wherein the platform is operable on each node of the plurality of nodes, and wherein each node of the plurality of nodes of the platform comprises:
    a distributed log for recording encrypted transactions, wherein the encrypted transactions in each of the distributed logs among the plurality of nodes are consistent; and
    a state database for storing state information based on the recorded encrypted transactions in the distributed log, and
  wherein the platform enables each node of the plurality of nodes is to privately communicate a transaction via a private channel the respective node is a member of by:

receiving, at a first node of the trustless decentralized network system, a transaction for sharing through the private channel on the trustless decentralized networked system;

accessing, by the first node, an encryption key associated with the private channel, wherein one or more nodes of the plurality of nodes are members of the private channel, wherein each of the one or more nodes possesses the encryption key, and wherein the encryption key enables the one or more nodes to decrypt the encrypted transaction, execute the transaction, and store results of the executed transaction in the respective state database;

encrypting the transaction based on the encryption key associated with the private channel, wherein member nodes of the private channel are in possession of the encryption key; and transmitting the encrypted transaction to all other nodes of the plurality of nodes to record in their respective distributed logs, wherein the encryption key enables the member nodes of the private channel to: decrypt the encrypted transaction, execute the decrypted transaction, and store results of the executed decrypted transaction in its respective state database.

10. The computer-implemented method of claim 9, wherein
the platform enables each node of the plurality of nodes to publicly communicate the transaction by:
transmitting the transaction to all other nodes of the plurality of nodes to record in their respective distributed logs.

11. The computer-implemented method of claim 9, wherein the private channel is established by distributing the encryption key to the member nodes of the private channel.

12. The computer-implemented method of claim 9, wherein the platform further enables a unique identity to be associated with each node of the plurality of nodes.

13. The computer-implemented method of claim 9, wherein the platform further comprises a secret database for storing encryption keys associated with private channels.

14. The computer-implemented method of claim 9, wherein the encryption key is a symmetric key.

15. The computer-implemented method of claim 9, wherein the encryption key is an asymmetric key.

16. The computer-implemented method of claim 9, wherein the encryption key comprises a pair of encryption and decryption keys.

17. Non-transitory computer-readable storage media including computer-executable instructions that, when executed by a computing system, cause the computing system to perform operations comprising:
providing a platform for operation on each node of a plurality of nodes of a trustless decentralized network system, wherein each node of the plurality of nodes comprises a computer processor and an electronic storage medium, wherein the platform is operable on each node of the plurality of nodes, and wherein each node of the plurality of nodes of the platform comprises:
a distributed log for recording encrypted transactions, wherein the encrypted transactions in each of the distributed logs among the plurality of nodes are consistent; and
a state database for storing state information based on the recorded encrypted transactions in the distributed log, and
wherein the platform enables each node of the plurality of nodes is to privately communicate a transaction via a private channel the respective node is a member of by:
receiving, at a first node of the trustless decentralized network system, a transaction for sharing through the private channel on the trustless decentralized network system;
accessing, by the first node, an encryption key associated with the private channel, wherein one or more nodes of the plurality of nodes are members of the private channel, wherein each of the one or more nodes possesses the encryption key, and wherein the encryption key enables the one or more nodes to decrypt the encrypted transaction, execute the transaction, and store results of the executed transaction in its respective state database;
encrypting the transaction based on the encryption key associated with the private channel, wherein member nodes of the private channel are in possession of encryption key; and
transmitting the encrypted transaction to all other nodes of the plurality of nodes to record in their respective distributed logs, wherein the encryption key enables the member nodes of the private channel to: decrypt the encrypted transaction, execute the decrypted transaction, and store results of the executed decrypted transaction in its respective state database.

18. The non-transitory computer readable storage medium of claim 17, wherein the private channel is established by distributing the encryption key to the member nodes of the private channel.

19. The non-transitory computer readable storage medium of claim 17, wherein the platform further comprises a secret database for storing encryption keys associated with private channels.

20. The non-transitory computer readable storage medium of claim 17, wherein the encryption key is a symmetric key.

* * * * *

UNITED STATES PATENT AND TRADEMARK OFFICE
CERTIFICATE OF CORRECTION

PATENT NO. : 11,184,394 B1  
APPLICATION NO. : 16/890700  
DATED : November 23, 2021  
INVENTOR(S) : Lukasz Dobrek Page 1 of 2

It is certified that error appears in the above-identified patent and that said Letters Patent is hereby corrected as shown below:

On the Title Page

On Page 2, Column 2, under Item (56) Other Publications, Line 16, delete "availabe" and insert --available--.

On Page 2, Column 2, under Item (56) Other Publications, Line 44, delete "defualt" and insert --default--.

On Page 3, Column 2, under Item (56) Other Publications, Line 27, delete "1 -di stributed" and insert --1-distributed--.

On Page 3, Column 2, under Item (56) Other Publications, Line 30, delete "Reasearch" and insert --Research--.

In the Specification

In Column 12, Line 24, delete "xlly" and insert --x∥y--.

In Column 20, Line 12 (Approx.), delete "DBA" and insert --$DB_A$--.

In Column 20, Line 50, delete "DBA" and insert --$DB_A$--.

In Column 20, Line 55, delete "DBA" and insert --$DB_A$--.

In Column 22, Line 11, delete "DBA" and insert --$DB_A$--.

In Column 22, Line 15, delete "DBA" and insert --$DB_A$--.

In Column 23, Line 35, delete "$TX_X$" and insert --$TX_x$--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,184,394 B1

In Column 31, Line 12, delete "∀" and insert --$\forall_v$--.

In Column 31, Line 14, delete "vn" and insert --$v_n$--.

In Column 31, Line 21, delete "pi" and insert --$p_i$--.

In Column 31, Line 21, delete "0" and insert --$\varphi$--.

In Column 31, Line 48, delete "(p" and insert --p--.

In Column 31, Line 52, delete "(V" and insert --V--.

In Column 32, Line 6, delete "11,3,41" and insert --{1,3,4}--.

In Column 33, Line 65, delete "(key" and insert --key--.

In Column 33, Line 65, delete "$p^w$" and insert --$p_i^r$--.

In Column 37, Line 19, delete "Freeze Channel" and insert --FreezeChannel--.

In Column 39, Line 34, delete "PYPHON" and insert --PYTHON--.

In the Claims

In Column 44, Claim 9, Line 66, delete "nodes is" and insert --nodes--.

In Column 46, Claim 17, Line 16 (Approx.), delete "nodes is" and insert --nodes--.